(12) United States Patent
Schlanger

(10) Patent No.: US 12,330,447 B2
(45) Date of Patent: *Jun. 17, 2025

(54) CONNECTING SYSTEM FOR TENSILE ELEMENTS

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 1083 days.

This patent is subject to a terminal disclaimer.

(21) Appl. No.: 17/020,852

(22) Filed: Sep. 15, 2020

(65) Prior Publication Data

US 2021/0078361 A1    Mar. 18, 2021

Related U.S. Application Data

(63) Continuation-in-part of application No. 15/412,151, filed on Jan. 23, 2017, now Pat. No. 10,814,671, which is a continuation-in-part of application No. 14/641,615, filed on Mar. 9, 2015, now Pat. No. 9,815,321, which is a continuation-in-part of application No. 12/930,643, filed on Jan. 13, 2011, now Pat. No. 8,985,709, which is a continuation-in-part of application No. 12/806,064, filed on Aug. 5, 2010, now Pat. No. 8,657,387, which is a continuation-in-part of application No. 11/879,333, filed on Jul. 17, 2007, now Pat. No. 7,784,878, which is a continuation-in-part of application No. 10/755,653, filed on Jan. 12, 2004, now Pat. No. 7,357,460.

(60) Provisional application No. 62/289,389, filed on Feb. 1, 2016, provisional application No. 60/439,819, filed on Jan. 13, 2003.

(51) Int. Cl.
| | | |
|---|---|---|
| B60B 1/02 | (2006.01) | |
| B60B 1/00 | (2006.01) | |
| B60B 1/04 | (2006.01) | |

(52) U.S. Cl.
CPC ............ B60B 1/0261 (2013.01); B60B 1/003 (2013.01); B60B 1/041 (2013.01); B60B 1/044 (2013.01)

(58) Field of Classification Search
CPC ...................... B60B 1/041–046; B60B 1/0261
See application file for complete search history.

(56) References Cited

U.S. PATENT DOCUMENTS

| | | | | | |
|---|---|---|---|---|---|
| 1,909,344 | A | * | 5/1933 | Green | ..................... F16G 11/02 403/360 |
| 4,729,605 | A | * | 3/1988 | Imao | ...................... B60B 1/003 301/58 |

(Continued)

*Primary Examiner* — Jason R Bellinger

(57) ABSTRACT

A connecting system for a tensile element including a longitudinal tensile element and a connector. The connector has an external connector surface and an internal cavity with an internal surface with a pre-formed lateral connector surface extending generally laterally inwardly. The internal cavity sleevably overlaps at the tensile element in an overlap region. The connector is crimped to create a crimped joinder between the connector and tensile element where a portion of the external connector surface is pressed to plastically deform the connecting element and displace the internal surface laterally inwardly to deboss the external surface in the overlap region. The connector includes a laterally outwardly projecting overlie surface to provide an external overlie engagement for connection with a bracing element and to support tensile load.

21 Claims, 14 Drawing Sheets

(56) References Cited

U.S. PATENT DOCUMENTS

| | | | |
|---|---|---|---|
| 5,110,190 A * | 5/1992 | Johnson | B60B 5/02 |
| | | | 301/58 |
| 6,036,281 A * | 3/2000 | Campbell | B60B 5/02 |
| | | | 301/58 |
| 7,192,097 B2 | 3/2007 | Schlanger | |
| 7,357,460 B2 * | 4/2008 | Schlanger | B60B 21/064 |
| | | | 403/267 |
| 7,784,878 B2 * | 8/2010 | Schlanger | B60B 1/003 |
| | | | 301/55 |
| 8,246,119 B2 * | 8/2012 | Schlanger | B60B 1/042 |
| | | | 301/59 |
| 8,657,387 B2 * | 2/2014 | Schlanger | B60B 1/003 |
| | | | 301/58 |
| 8,985,709 B2 * | 3/2015 | Schlanger | B60B 21/062 |
| | | | 301/55 |
| 9,815,321 B2 * | 11/2017 | Schlanger | B60B 31/02 |
| 10,493,796 B2 * | 12/2019 | Schlanger | B60B 1/0261 |
| 10,814,671 B2 * | 10/2020 | Schlanger | B60B 1/042 |

\* cited by examiner

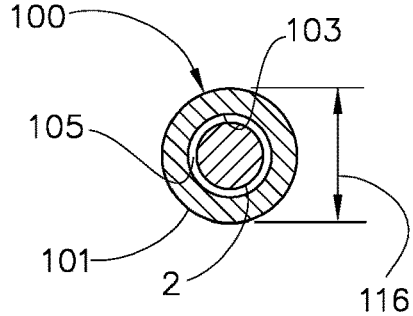
FIG. 8a
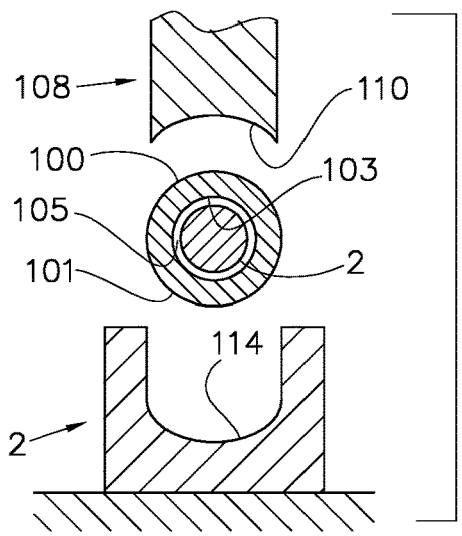
FIG. 8b
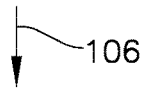
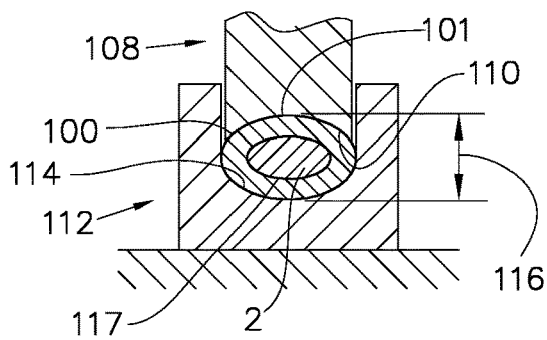
FIG. 8c
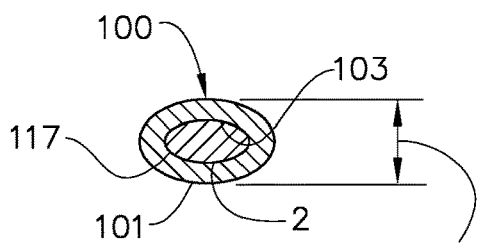
FIG. 8d
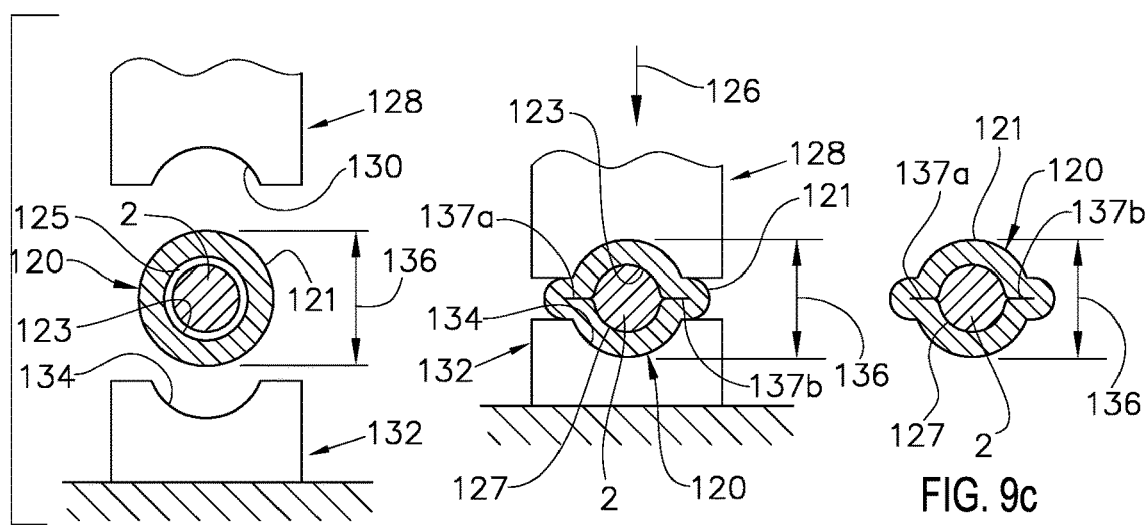
FIG. 9a
FIG. 9b
FIG. 9c

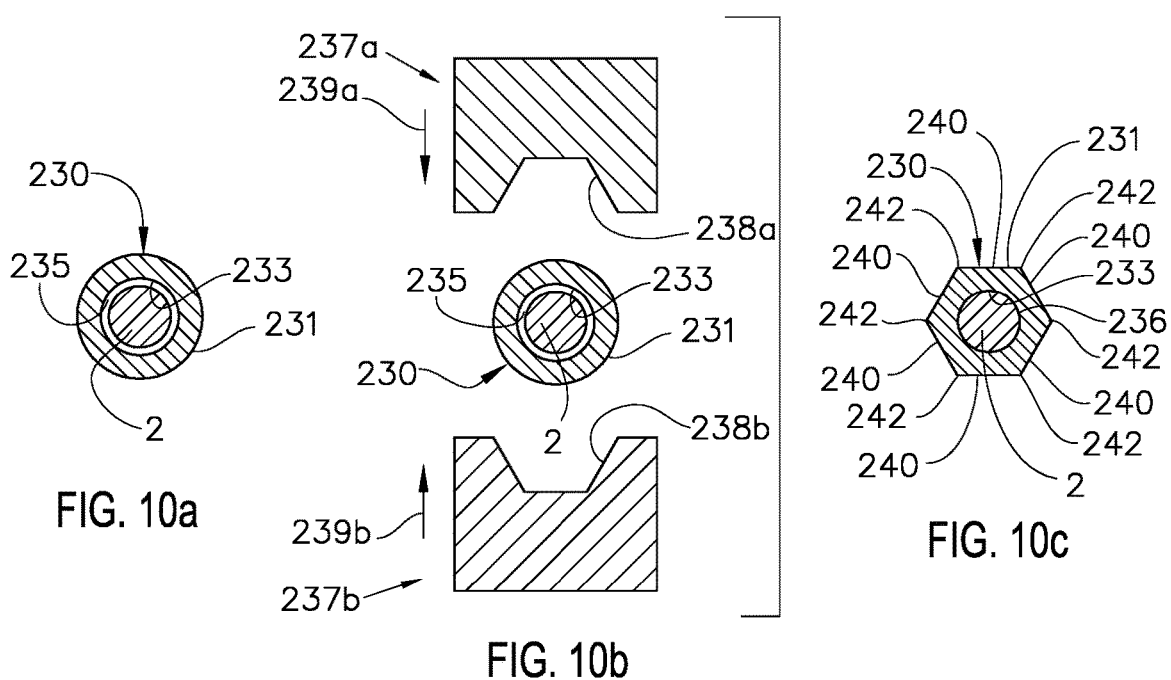
FIG. 10a
FIG. 10b
FIG. 10c
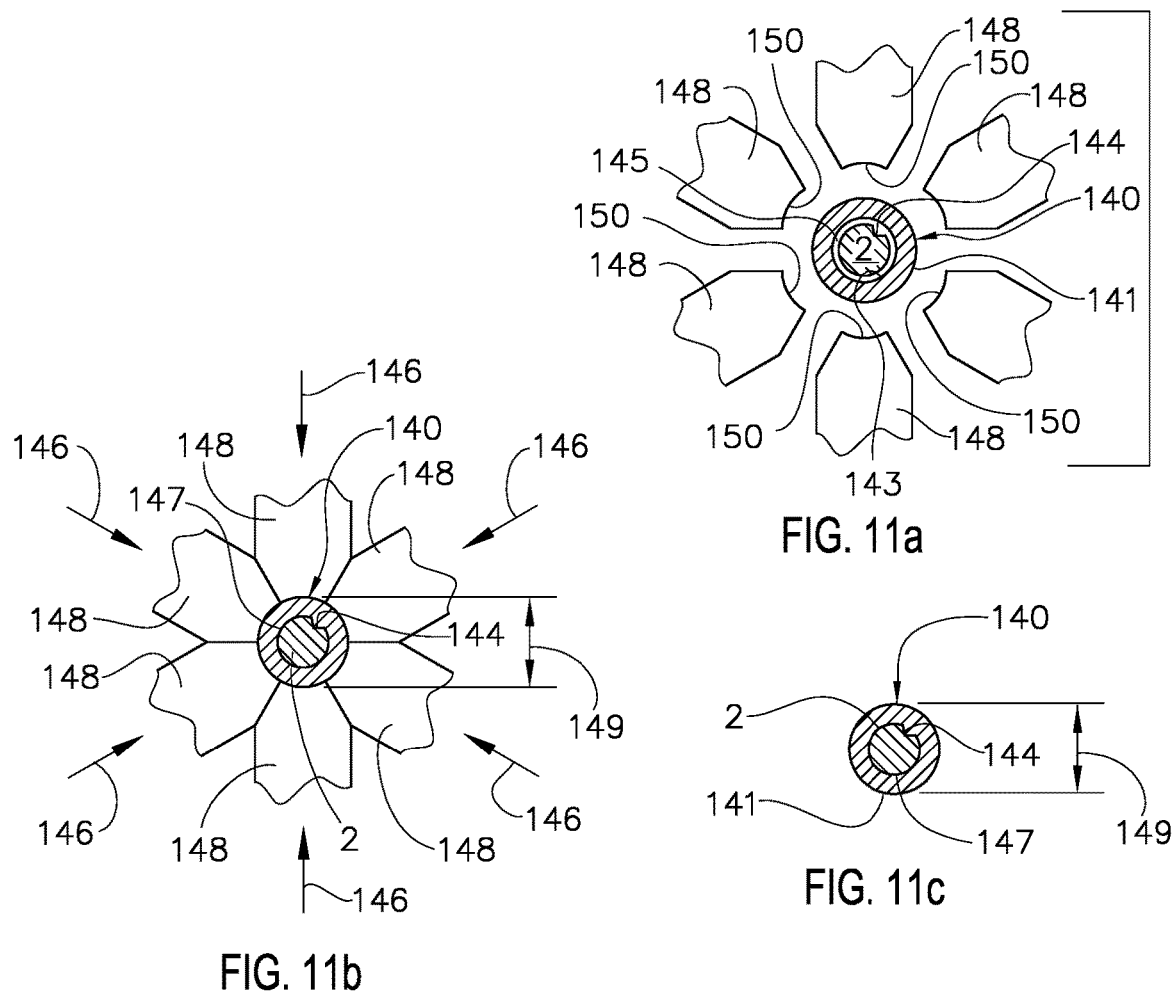
FIG. 11a
FIG. 11b
FIG. 11c

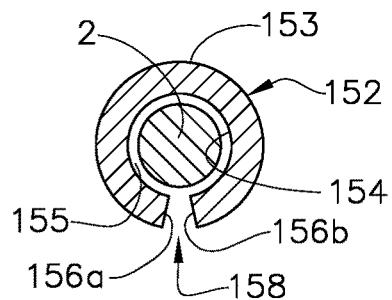
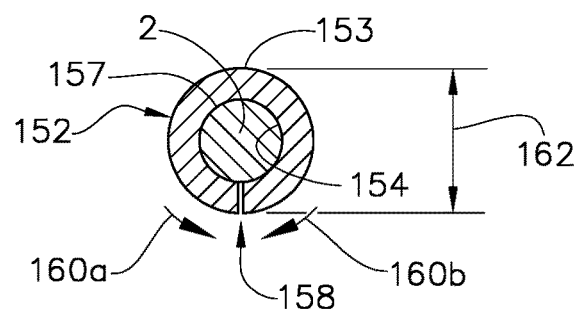
FIG. 12a    FIG. 12b
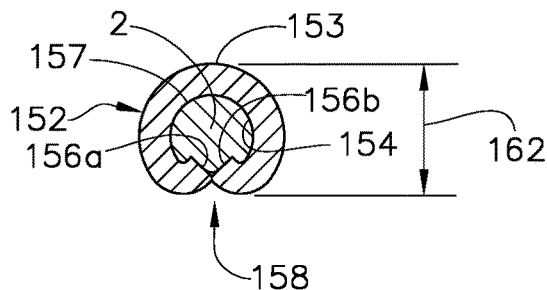
FIG. 12c
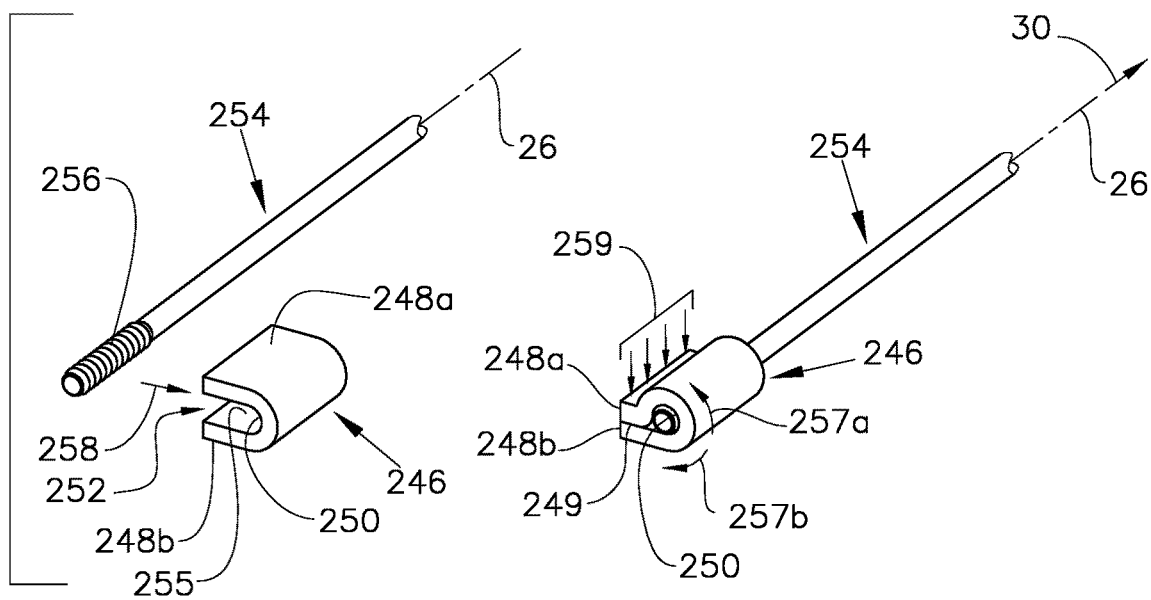
FIG. 13a    FIG. 13b

CONNECTING SYSTEM FOR TENSILE ELEMENTS

CROSS-REFERENCE TO RELATED APPLICATIONS

This application is also a Continuation-In-Part of U.S. patent application Ser. No. 15/412,151, filed Jan. 23, 2017 and issued as U.S. Pat. No. 10,814,671 on Oct. 27, 2020;

U.S. patent application Ser. No. 15/412,151 claims priority of Provisional Patent Application Ser. No. 62/289,389, filed Feb. 1, 2016;

U.S. patent application Ser. No. 15/412,151 is also a Continuation-In-Part of U.S. patent application Ser. No. 14/641,615, filed Mar. 9, 2015 and issued as U.S. Pat. No. 9,815,321 on Nov. 14, 2017;

U.S. patent application Ser. No. 14/641,615 is a Continuation-In-Part of U.S. patent application Ser. No. 12/930,643, filed Jan. 13, 2011 and issued as U.S. Pat. No. 8,985,709 on Mar. 24, 2015;

U.S. patent Ser. No. 12/930,643 is a Continuation-In-Part of U.S. patent application Ser. No. 12/806,064, filed Aug. 5, 2010 and issued as U.S. Pat. No. 8,657,387 on Feb. 25, 2014;

U.S. patent application Ser. No. 12/806,064 is a Continuation-In-Part of U.S. patent application Ser. No. 11/879,333, filed Jul. 17, 2007 and issued as U.S. Pat. No. 7,784,878 on Aug. 31, 2010;

U.S. patent application Ser. No. 11/879,333 is a Continuation-In-Part of U.S. patent application Ser. No. 10/755,653, filed Jan. 12, 2004 and issued as U.S. Pat. No. 7,357,460 on Apr. 15, 2008;

U.S. patent application Ser. No. 10/755,653 claims priority of U.S. provisional patent application Ser. No. 60/439,819, filed Jan. 13, 2003.

BACKGROUND OF THE INVENTION

(1) Field of the Invention

The present invention relates to an improved connection system for a longitudinal tensile element, particularly applicable to the spoke of a bicycle wheel.

(2) Description of the Related Art

Heretofore, the vast majority of bicycle wheels have been constructed using steel wire spokes with one headed end for connection with the bicycle hub and an opposing end that is directly threaded to accept a spoke nipple that engages the rim. By adjusting the threaded connection between the spoke and the nipple, the overall length of the spoke may be shortened or lengthened to create a balanced pre-tension in the spokes of the wheel.

A longitudinal tensile element describes a wide range of longitudinal structural elements that support loads in tension along their longitudinal length. Some examples of longitudinal tensile elements include control cables, guy wires, bicycle spokes, or other tendon-like applications where a wire, rod, cable, rope, or other tensile member may be utilized. Bicycle spokes serve as structural tensile elements where the tension of the spoke is resisted by the compression of the outer rim hoop to create a remarkably efficient wheel structure for handling the loads associated with the operation of the bicycle. The technology of conventional bicycle spokes has remained unchanged for the better part of a century.

Cyclists are continually striving to reduce the weight and increase the efficiency of their bicycle, especially rotating components such as the bicycle wheel. However, the steel spokes of conventional bicycle wheels are quite heavy and add significant weight to the wheel assembly.

In addition to their excessive weight, steel bicycle spokes have poor vibration-damping characteristics and tend to be very efficient at transmitting road vibration to the rider. By transmitting vibration, rather than absorbing it, the conventional steel-spoke bicycle wheel lacks in rider comfort and control.

In attempt to reduce weight, many makers of high-end wheels have resorted to forming their spokes from thinner gage steel wire. This causes the stress in the spoke to increase and makes the wheel more prone to spoke failure due to fatigue. The thinner steel wire has lower tensile stiffness, which can contribute to a reduced lateral stiffness of the wheel.

In the last 20 years, great strides have been made in the development of very lightweight materials that also have excellent tensile characteristics. Some of the most attractive of these materials include high-strength fibers, such as carbon fiber, aramid fiber, liquid crystal fiber, PBO fiber and the like. However, when attempting to utilize them as spokes in bicycle wheel construction, these fibrous materials are far more difficult to efficiently couple or terminate than their conventional steel-wire counterparts. In the few cases where these high strength spokes have successfully been utilized in bicycle wheels, their cost and complexity has been very great. This is the primary reason that the vast majority of bicycle wheels are still constructed using steel spokes.

Accordingly, it is an objective of the present invention to overcome the forgoing disadvantages and to provide a coupling or termination connection for a vehicle wheel spoke or tensile element that is strong, lightweight and inexpensive to produce.

An efficient connector coupling or termination should have a tensile strength that approximates the tensile strength of the lightweight tensile element and should not be so heavy as to detract from the weight benefit of these lightweight materials. In addition, cost is always a concern in the bicycle industry. These lightweight materials are often more expensive than the steel wire that they replace. An overly complex or expensive connector would make such a spoke to be cost prohibitive.

It is a further objective of the present invention to provide a construction as aforesaid which reduces cost and provides a wheel that is light in weight and high in strength and reliability.

Further objects and advantages of the present invention will appear hereinbelow.

SUMMARY OF THE INVENTION

In accordance with the present invention, it has now been found that the forgoing objects and advantages may be readily obtained.

The present invention comprises a longitudinal tensile element, such as a spoke, having an end portion and a cross-section thereof, a connecting element, a bracing element, and a tensile axis of applied tensile load along the span of the spoke. The connecting element is joined to the spoke by means of a crimped joinder where the connecting element, or a portion thereof, is plastically deformed to engage the spoke. The deformed connecting element is connected to the bracing element (i.e. the rim or the hub).

The connecting element may be made of a wide range of highly or moderately ductile metallic materials, including aluminum, magnesium, titanium, steel, brass, copper, among others. Other highly or moderately ductile materials may also be utilized, including fiber reinforced polymer among others. The connecting element may be formed by any of several fabrication methods known in industry, including molding, casting, forging, drawing, extruding, machining, among others. Also, it may be preferable to provide external geometry that may include a wide range of geometric features and surfaces, which may be easily optimized to provide a highly effective connection between the connector and the bracing element.

The terms "connecting element" and "connector" are used interchangeably herein. In a preferred embodiment, the connecting element includes threads to provide a means of threaded engagement between the connecting element and the bracing element. In a further preferred embodiment, the connecting element includes a laterally outwardly projecting surface or edge to provide an overlie engagement between the connecting element and the bracing element. The connector may be connected to the bracing element either directly or indirectly through an intermediate connecting element. In a further preferred embodiment, the connector includes external geometry that allows it to be manipulated, either manually or with a mating tool. The connector also includes an internal cavity to receive the spoke. In a preferred embodiment, this internal cavity includes a configured surface and/or a smooth surface.

The spoke may be made of a number of different materials, including metallic materials such as aluminum, titanium, and/or steel wire. In an advantageous embodiment, the spoke includes high-strength reinforcement fibers. In a further advantageous embodiment, the reinforcement fibers are aligned to be parallel to the tensile axis. In a further advantageous arrangement, the fibers are at least 4 mm in length or are preferably continuous and generally extend along its full length. In a still further advantageous embodiment, the reinforcement fibers are encapsulated in a matrix. In a yet further embodiment, the matrix is at least one of a thermoplastic and a thermoset polymer resin matrix. Such fiber-reinforced spokes may have very high tensile properties at a much lower weight than conventional steel or metallic spokes, thus providing a significant weight savings to the wheel assembly. The spoke(s) may be produced by drawing, extruding, pultruding, machining, molding, forging, casting, among many other fabrication processes well known in industry. In a preferred embodiment, this spoke may include a configured surface and/or a smooth surface in the region where it interfaces with the connector.

The present invention obtains many advantages. One advantage of the present invention is the ability to utilize lightweight materials for the spoke while minimizing the cost and expense of the completed assembly.

The embodiments described herein represent a range of configurations wherein a connecting element (i.e. connector) is utilized to create an effective termination or coupling of a tensile element such as a bicycle spoke. The result is an improved assembly, including a means to connect the spoke with a bracing element, such as a hub or rim, to create a bicycle wheel that is exceptionally durable and light in weight.

The present invention may be readily adapted to lightweight fibrous materials including high-performance fibers, such as carbon fiber, aramid fiber (such as Kevlar®), LCP (liquid crystal fiber such as Vectran®), PBO (polyphenylenebenzobisoxasole) fiber such as Zylon®), polyethylene fiber (such as Spectra®) and the like. These materials may be of the dry-fiber form or they may preferably be impregnated within a matrix. In any case, these materials represent a significant performance improvement over the steel spokes they replace. In comparison with the steel wire commonly used in spoke construction, these fibrous materials have equivalent or greater tensile strength than the steel spoke at a much lower density. This allows for the construction of a much lighter spoke and a lighter wheel. Further, these materials have significantly better vibration-damping characteristics for greater rider comfort and control. Still further, these materials also have excellent tensile fatigue properties to reduce or even eliminate spoke failures due to fatigue.

The embodiments described herein are highly effective at transmitting tensile loads between the spoke and the bracing element and may be designed to provide a connection that is as strong or stronger than the spoke itself. Further, the spoke and connector components may be produced through a variety of well-known and cost-effective processes that are capable of producing parts in high volume and at relatively low cost. Further, the crimping methods to join the spoke to the connector can also be achieved with highly manufacturable and cost effective processes Thus, the embodiments described herein are highly effective at producing a lightweight and high-performance vehicle wheel at an economical cost.

Further features of the present invention will become apparent from considering the drawings and ensuing description.

BRIEF DESCRIPTION OF THE DRAWINGS

The present invention will be more readily understandable from a consideration of the accompanying exemplificative drawings, wherein:

FIG. 2b is a cross-section view of the prior art bicycle wheel as seen generally in the direction 15-15 of FIG. 2a;

FIG. 3b is a partial cross-section view of the bicycle wheel of FIG. 3a as seen generally in the direction 20-20 of FIG. 3a;

FIG. 4b is a partial cross-section view of the bicycle wheel of FIG. 4a as seen generally in the direction 169-169 of FIG. 4a;

FIG. 8a is a cross-sectional view of an additional embodiment of the present invention, taken perpendicular to the tensile axis, showing the connector surrounding the cross section of the spoke, prior to crimping of the connector;

FIGS. 8b-d are cross-sectional views of the embodiment of FIG. 8a, taken perpendicular to the tensile axis, and showing the progressive sequence of operations involved in creating a crimped connection between the spoke and the connector, including a punch and nest;

FIGS. 9a-c are partial cross-sectional views of an additional embodiment of the present invention, taken perpendicular to the tensile axis, and showing the progressive sequence of operations involved in creating a crimped connection between the spoke and the connector, including pinched folds in the connector;

FIGS. 10a-c are cross-sectional views of an additional embodiment of the present invention, taken perpendicular to the tensile axis, and showing the progressive sequence of operations involved in creating a crimped connection between the spoke and the connector, including non-circular and/or variable external geometry in the connector;

FIGS. 11a-c are partial cross-sectional views of an additional embodiment of the present invention, taken perpendicular to the tensile axis, and showing the progressive sequence of operations involved in creating a crimped connection between the spoke and the connector, including a multiplicity of punches;

FIGS. 12a-c are cross-sectional views of an additional embodiment of the present invention, taken perpendicular to the tensile axis, and showing the progressive sequence of operations involved in creating a crimped connection between the spoke and the connector, including a connector with longitudinal split;

FIGS. 13a-b are partial perspective views of an additional embodiment of the present invention, showing the progressive sequence of operations involved in creating a crimped connection between the spoke and the connector, including a connector with longitudinal sidewall opening;

DETAILED DESCRIPTION OF THE INVENTION

Figure 1:
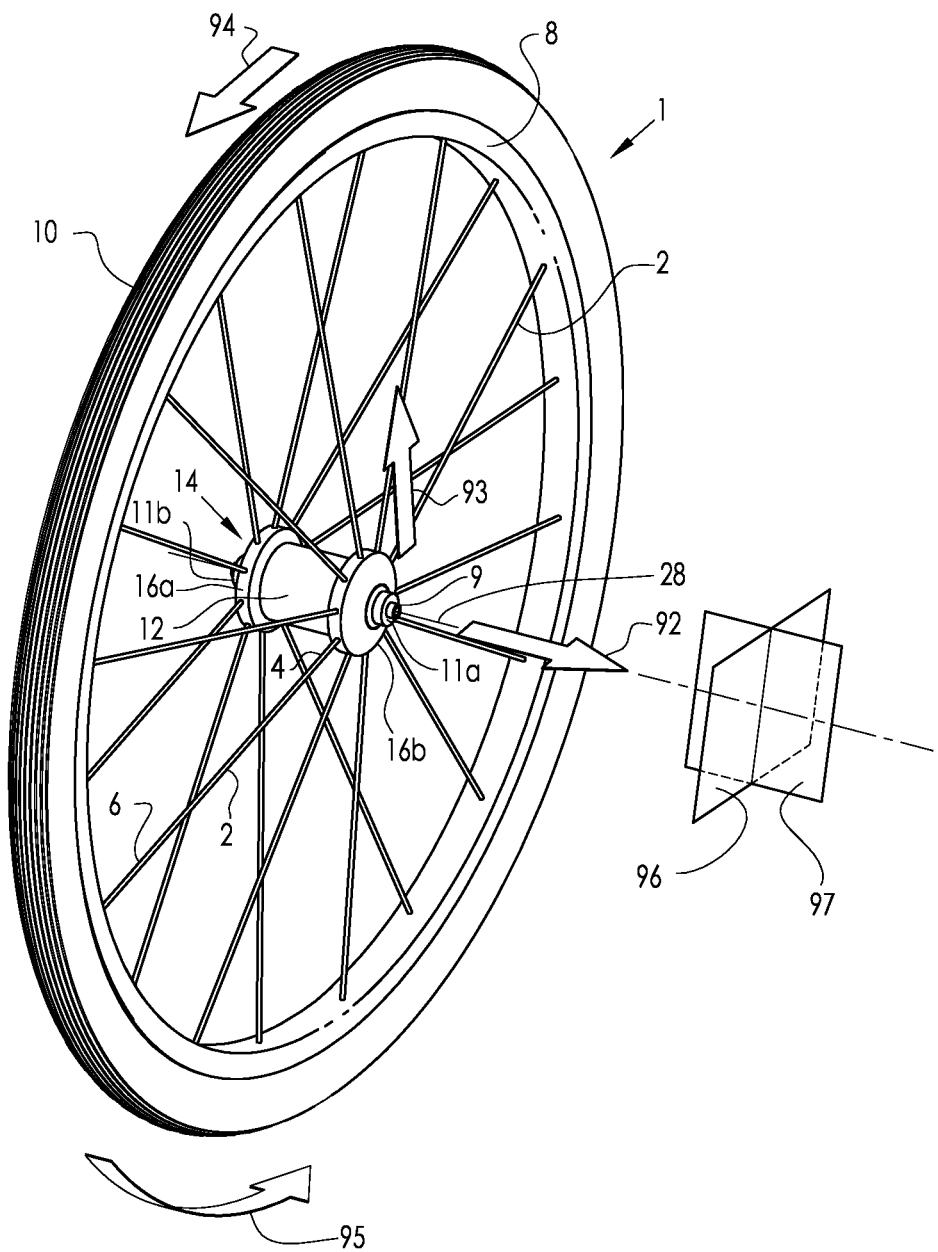
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. For clarity, the bicycle frame and the quick release skewer assembly are not shown in this figure. The hub shell 14 is rotatable about the axle 9 and includes at least two axially spaced hub flanges 16a and 16b, each of which include a means for connecting with the spokes 2. Axle 9 includes end faces 11a and 11b that define the spacing of its mounting with the frame (not shown). The axial axis 28 is the axial centerline of rotation of the bicycle wheel 1. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is any direction parallel with the axial axis 28. The radial direction 93 is a direction generally perpendicular to the axial direction 92 and extending generally from the axial axis 28 radially outwardly toward the rim 8. The tangential direction 94 is a direction generally tangent to the rim at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis. An orientation that is radially inboard (or inward) is nearer to the axial axis 28 of rotation and a radially outboard (or outward) is further from the axial axis. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard orientation is an orientation that is radially proximal to the axial axis 28 and a radially outboard orientation is an orientation that is radially distal to the axial axis 28. An axially inwardly facing surface is a surface that faces toward the axial midpoint between the two end faces 11a and 11b. Conversely, an axially outwardly facing surface is a surface that faces away from the axial midpoint between the two end faces 11a and 11b. While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

Spokes 2 are representative examples of longitudinal tensile elements as applied to a bicycle wheel. Such example as applied to a bicycle wheel is described throughout this disclosure, however it is understood that the connecting system for the spokes described herein may be applied to other types of longitudinal tensile elements as well.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be adapted or otherwise applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pre-tensioned during assembly to create a pre-tensioned structure of balanced spoke tension that allows the axle supporting loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral loads, only a single hub flange may be employed.

Figure 2A:
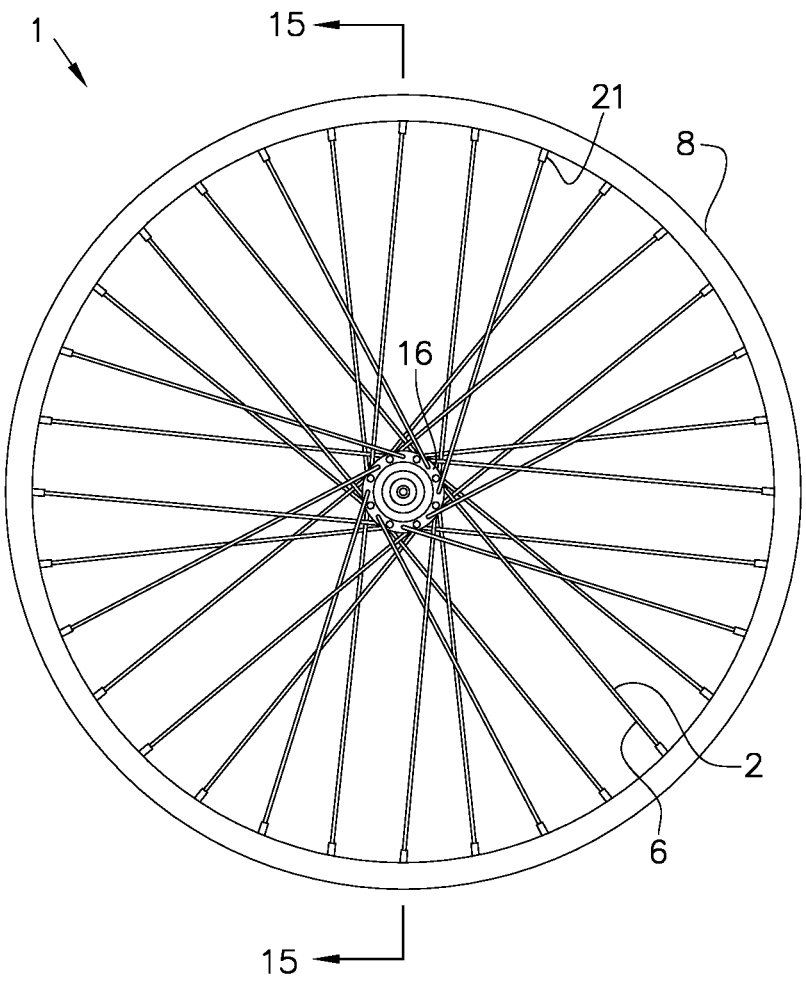
FIG. 2a is an axial plan view illustrating a prior art bicycle wheel.
Figure 2B:
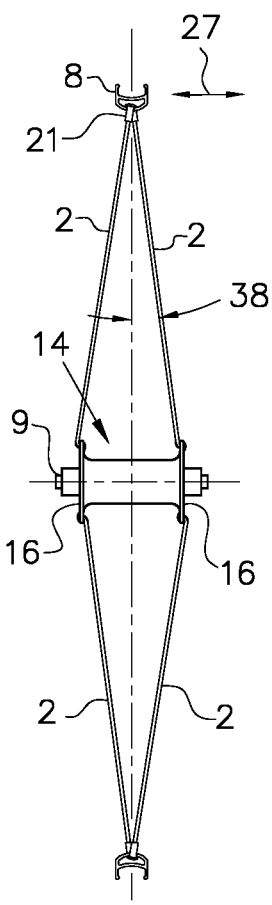
Figure 2C:
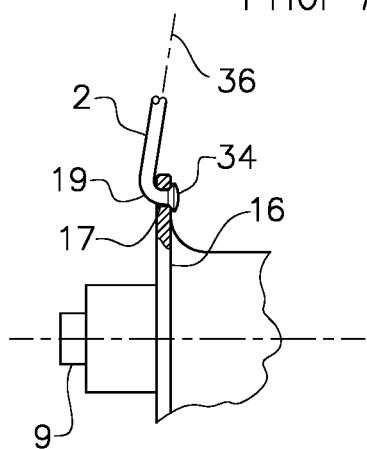
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of pre-tension is induced in the spoke 2. By selectively adjusting this threaded engagement, the spoke pre-tension may be adjusted to align the trueness of the rim 8. The spoke pre-tension is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction 92) of the wheel 1 is also increased.

Figure 3A:
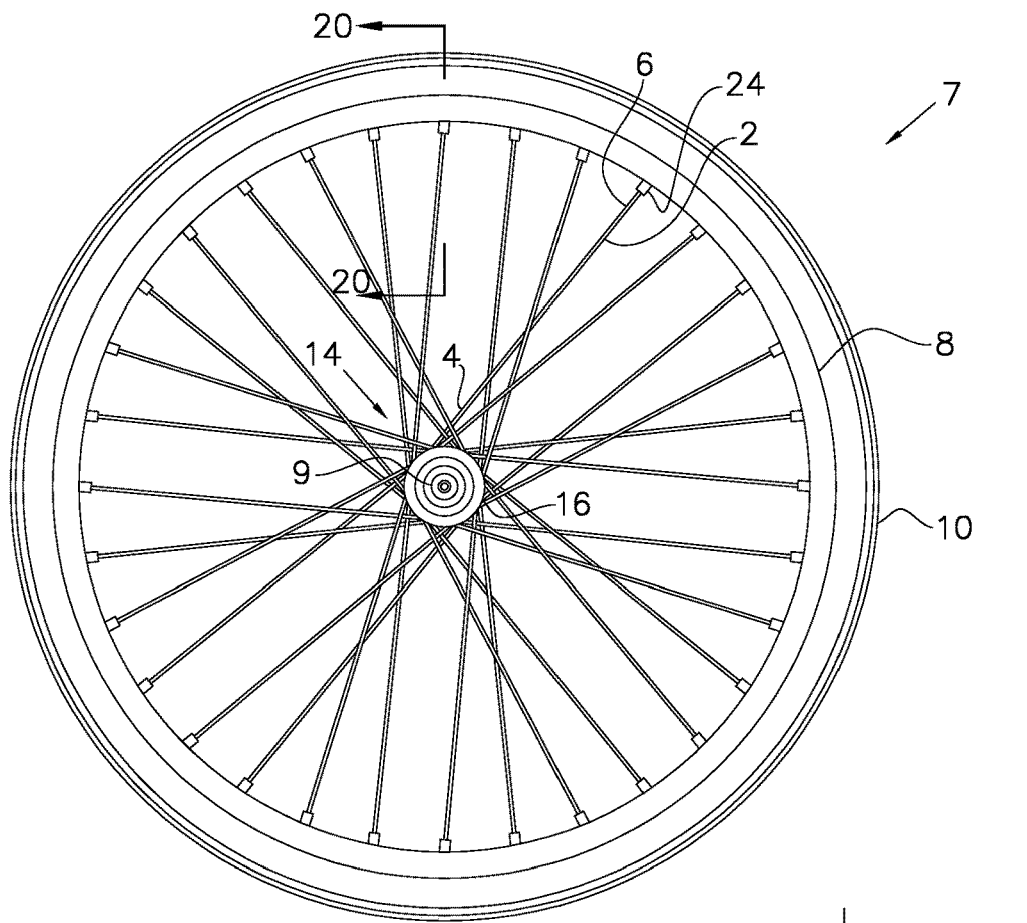
FIG. 3a is a plan view of an embodiment of the present invention, illustrating a bicycle wheel including collars or connecting elements, each serving as a termination for the corresponding spoke.

FIG. 3a shows an exemplary bicycle wheel 7 that corresponds to some of the embodiments described herein. This figure is shown to provide a generic assembly to illustrate an arrangement wherein the present invention may be adapted to utilization in bicycle wheel construction. The bicycle wheel 7 includes spokes 2, hub 14, rim 8, and tire 10. The hub 14 includes hub flanges 16 and axle 9. The rim 8 includes geometry for mounting of a tire 10 and a multiplicity of spoke holes 22 in its spoke bed wall 33, each to accept an individual connector 24. It is noted that the rim 8 shown here is an exemplary representation of a bracing element that may serve as a rim or a hub flange and may take on a wide range of forms. The spokes 2 are preferably constructed of fiber-reinforced material and are connected at their first end 4 to their associated hub flange 16 and at their second end 6 to the rim 8. The spoke 2 is a long slender tensile element with a longitudinal axis 26 along its length and generally parallel to its sidewalls. The spoke 2 also has a tensile axis 36 of applied tensile load, which is generally collinear to the longitudinal axis 26. For the purposes of definition, the term "longitudinal" herein refers to alignment along the longitudinal axis.

Figure 3B:
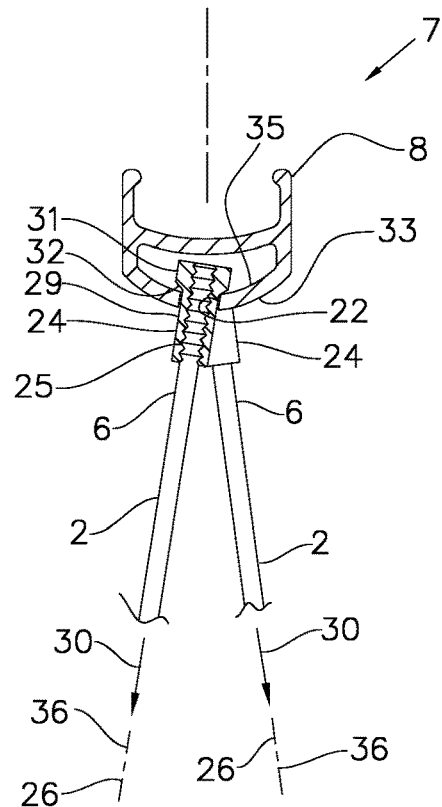

To create a solid connection between the spoke 2 and the rim 8, the second end 6 of each fiber reinforced spoke 2 is first connected to a corresponding connector 24 by means of an crimped connection at an engagement interface 25 as described variously within the instant disclosure. The connector 24 is crimped to the second end 6 of the spoke 2 by means of one of the embodiments of the present invention. The connector 24 includes a shank portion 29, a head portion 31, and a transition surface 32 therebetween as shown in FIG. 3b, which is a detail view of the embodiment described in FIG. 3a and shows the rim 8 in cross-section. As shown in FIG. 3b, shank portion 29 extends through spoke hole 22, with transition surface 32 serving as an engagement surface to bear against the radially outboard surface 35 of the spoke bed wall 33 in an overlie engagement, which provides blocking engagement to resist spoke tension 30. Transition surface 32 may be considered as a laterally outwardly projecting engagement surface of the connector 24 to provide an overlie engagement with the rim 8 (i.e. bracing element). In this embodiment, the transition surface 32 projects laterally outwardly from the shank portion 29.

The connector 24 of FIGS. 3a-b is generally shown to serve as a termination to the spoke 2 and provide means to connect or anchor the spoke to a bracing element (i.e. rim 8). Note that the span of spoke 2 is aligned in the direction of spoke tension 30 and along the tensile axis 36, which extends through the longitudinal axis 26 of the spoke 2. FIG. 3a shows that several spokes 2 of the wheel 7 may be terminated at the rim 8 in this manner. The connector 24 may alternatively be connected to the first end 4 of the spoke 2 for connection to the hub 14. For simplicity in describing this embodiment, a rim 8 connection arrangement is shown herein, with the understanding that such an embodiment may be easily adapted to hub connections as well.

It is understood that FIGS. 3a-b correspond to a simplified arrangement for illustration purposes. Several of the embodiments of the present invention may be applied to this arrangement, as well as arrangements which include facility for creating and/or adjusting spoke pre-tension, as described in FIGS. 2a-c.

The present invention comprises a spoke, which may be considered as a longitudinal tensile element having an end portion and a cross-section thereof, a connecting element, a bracing element, and a tensile axis of applied tensile load along the longitudinal tensile element. The longitudinal tensile element is connected to the connecting element by means of a crimped joinder between the longitudinal tensile element and the connecting element. In the embodiments shown herein, the longitudinal tensile element is a vehicle wheel spoke 2, the hub flange 16 constitutes a first bracing element and the outer rim 8 constitutes a second bracing element.

A spoke is a generally long slender element, with a length greater than its cross sectional width, and with a longitudinal axis extending generally along its length. The longitudinal tensile element (i.e. spoke) includes external sidewall surface(s) that extend generally along its length. As such, the longitudinal axis is generally parallel to the sidewall surface. The tensile axis is the axis along which tensile loads are applied to the tensile element, and is commonly collinear with the longitudinal axis, particularly in the region of the structural span of the longitudinal tensile element. For the purposes of explanation herein, the term "longitudinal axis" is generally interchangeable with the term "tensile axis", unless otherwise noted. Some examples of a longitudinal tensile element include the spoke of a vehicle wheel, a guy wire, a control cable, or a tendon. In most of the embodiments of the present invention, the longitudinal tensile element is capable of supporting tension, otherwise known as positive tensile loading, along its length. However, the tensile element may alternatively support compression, otherwise known as negative tensile loading, along its length, where the longitudinal tensile element provides columnar support between two bracing elements. The spoke span is considered as the portion of the spoke that is under tension and that extends between its anchor points and/or engagements at the bracing elements (i.e. hub and rim). A location outboard of the spoke span is a location along the tensile axis that is beyond or external to the spoke span.

The spoke has longitudinal external sidewall surface(s) that may be generally parallel to the longitudinal axis and an end face that is generally perpendicular to the sidewall surface. With a slender spoke, the sidewall tends to have far greater available surface area than its end face. Since an engagement interface of greater surface area tends to provide a more robust connection, it is often preferable to provide an engagement interface that extends longitudinally along the sidewall surface and preferably by a longitudinal length at least twice the cross sectional thickness of the spoke. This is in contrast to conventional spoke arrangements that focus these loads on a small point of contact, as with conventional prior art wheel assemblies.

It may be termed that a longitudinal engagement is an engagement that includes a continuous longitudinal engagement interface or an engagement that includes at least two engagement interface locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the interface surface area and will therefore increase the load carrying capacity of the crimped joinder between the connector and the spoke.

Since a longitudinal engagement may reduce the contact stresses at the engagement interface where the connector and the spoke are joined, this type of engagement is particularly applicable to bracing elements and/or spokes of polymer or reinforced polymer materials. This is particularly advantageous, since these materials tend to have high strength and light weight. However, heretofore these materials have been difficult to apply to conventional spoke connection systems that are generally focused on construction based on metallic materials. While the spokes described in the present invention may be constructed from a variety of materials, including a wide range of metallic materials and polymeric materials, one particularly advantageous aspect of the present invention is its ability to provide a termination means for a spoke of fiber reinforced polymer material.

In order to take advantage of the lightweight and high strength of the high-performance fibers mentioned hereinabove, it may be preferable to incorporate these material(s) in the spoke. These materials tend to be anisotropic and have greater strength along the direction of the fiber. Thus it may be preferable that these fibers are aligned to be parallel to the tensile axis. It is also preferable that these reinforcement fibers be encapsulated in a matrix. While short or discontinuous fibers often provide significant reinforcement to the matrix material, it is preferable that the fibers be as long as possible to provide the greatest overlap with adjacent fibers. The utilization of continuous fibers that extend generally along the entire length of the spoke provides the highest mechanical properties.

A spoke of high strength fibers in a resin matrix has numerous advantages in the present invention. Firstly, the resin matrix adheres the adjacent fibers to each other so that, through a joinder to the external surface of the spoke, the overmolded interface has a connection with all of the fibers of the spoke, which permits the fibers to work together for optimal tensile properties. Further, the resin matrix coats the outside of the pre-formed spoke, which creates an optimal surface for joinder with the connector at the engagement interface.

A bracing element is one that resists or braces against all or part of the load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element is that element which the tensile element is pushed against.

In the descriptions provided herein, the term "coupling" identifies an arrangement where a connecting element serves to provide a structural connection between two tensile elements (i.e. spokes), thus permitting tensile loads to be transmitted from one tensile element to another. A coupling may be considered to provide a connection within the span portion of the spoke or to couple together two spoke portions. In contrast, the term "termination" or "anchor" identifies a connecting element that serves to provide a means to connect the tensile element (i.e. spoke) at the terminus of its span, either directly or indirectly, to a bracing element (i.e. the hub or rim), to which the tensile element is intended to be anchored.

Figure 4A:
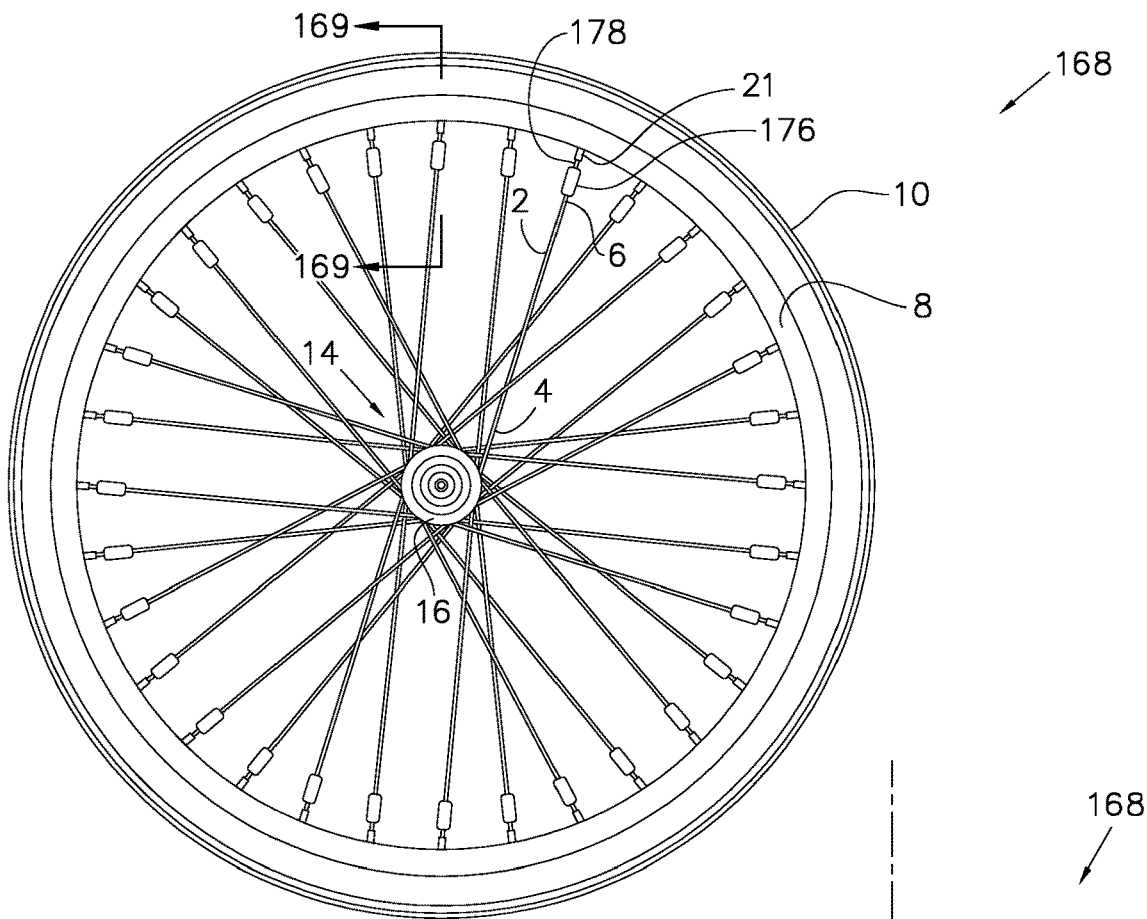
FIG. 4a is a plan view of another embodiment of the present invention, illustrating a bicycle wheel including coupling collars or connecting elements, each serving as a coupling for the corresponding spoke.
Figure 4B:
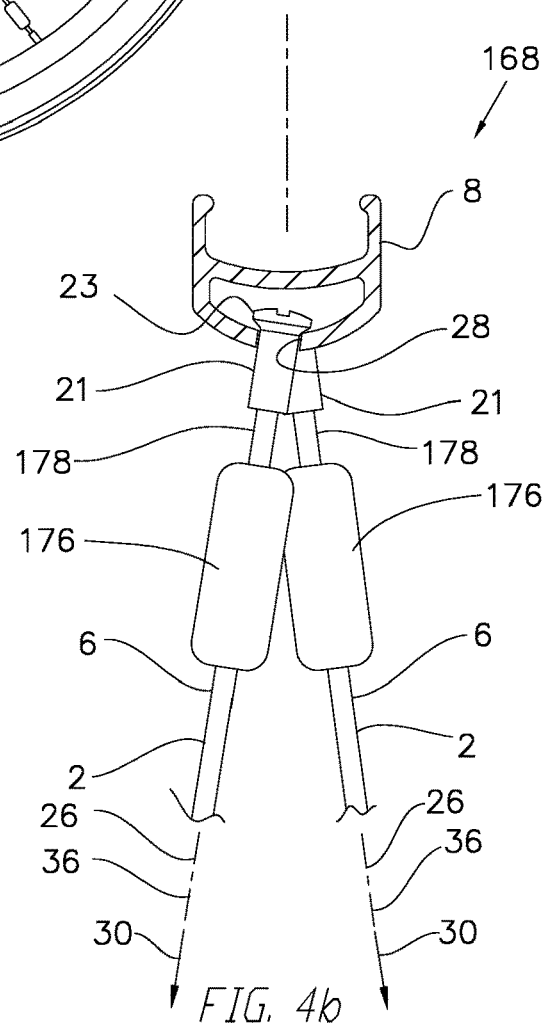

FIGS. 4a-b shows a bicycle wheel 168 similar in most respects to the bicycle wheel 7 of FIGS. 3a-b. However, the connector 24 is eliminated in favor of coupling collar 176 and fastener 178. The spokes 2 are connected at their first end 4 to the hub 14 and at their second end 6 to coupling collar 176. To create a solid connection between the spoke 2 and the rim 8, the second end 6 of the spoke 2 is first connected to a threaded fastener 178 by means of a coupling collar 176. The threaded fastener 178 includes external threads (not shown) in the conventional manner such that it is threadably mated to a spoke nipple 21 to connect with the rim 8 in the conventional manner. Spoke nipple 21 is generally conventional and includes an enlarged head portion 23. It may be seen that the coupling collar 176 serves as a coupling element to join together two tensile elements (i.e. the spoke 2 and the fastener 178). The tire 10 is mounted to the rim 8 in the conventional manner. FIG. 4a shows that all of the spokes of the wheel 168 may be connected at the rim 8 in this manner.

The coupling collar 176 and the fastener 178 may alternatively be connected to the first end 4 of the spoke 2 for connection to the hub 14. In such a case, the fastener 178 may be connected to the hub via spoke nipples 21 or it may be directly threaded into mating holes of the hub flange 16. Such an arrangement where the spoke 2 is threadably connected directly to the hub flange is well known in industry. For simplicity in describing the present invention, only rim 8 connection arrangements are shown herein, with the understanding that these embodiments may be easily adapted to hub connections as well.

FIG. 4b is a detail of the embodiment described in FIG. 4a and shows the rim 8 in cross-section. The spoke nipple 21 is fitted through hole 28 in the rim 8 and is retained in place by the head portion 23. The nipple 21 is of conventional configuration and includes a female threaded central bore that is mated to the male threaded fastener 178. Thus, spoke pre-tension may be adjusted for each individual spoke by threadably tightening the nipple 21 on the fastener 178, effectively shortening the spoke 2 to induce tension to the spoke 2. Note that the span of spoke 2 is aligned in the direction of spoke tension 30, including a tensile axis 36 that is aligned in the direction of spoke tension 30 and extends through the longitudinal axis 26 of the spoke 2. The connection between the spoke 2 and the fastener 178.

It may be considered that the nipple 21 serves as an intermediate connecting element, where the spoke 2 is connected to the nipple 21 (via connector 176 and fastener 178) and the nipple 21 is connected to the rim 8 as is conventional. It is noted that the fastener 178 is connected to the nipple 21 by a threaded connection where the thread flank (not shown) of the external thread (not shown) serves as a laterally projecting engagement surface that has an overlie engagement with the mating thread flank (not shown) of the internal thread (not shown) of the nipple 21.

Figure 5A:
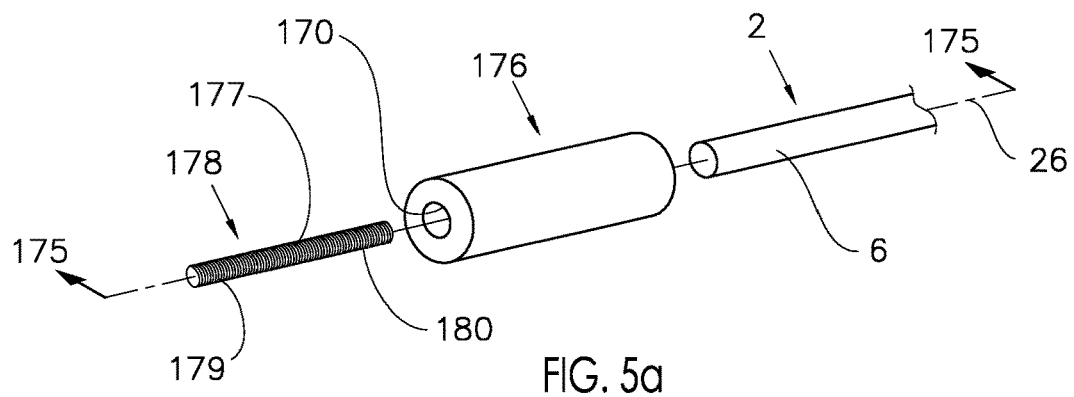
FIG. 5a is a partial perspective exploded view of an additional embodiment of the present invention, in exploded assembly, with the connector serving as a coupling between two tensile elements, shown prior to the crimped assembly.

FIGS. 5a-e provides an exemplary joining means corresponding to the embodiment of FIGS. 4a-b and describes how the coupling collar 176 may be plastically deformed to grip both a fastener 178 and the second end 6 of a spoke 2. As shown in FIG. 5a, threaded fastener 178 includes first end 180 and second end 179 and external threads 177 on its outer surface as shown. External threads 177 may be considered as a configured external surface of the threaded fastener 178.

Figure 5B:
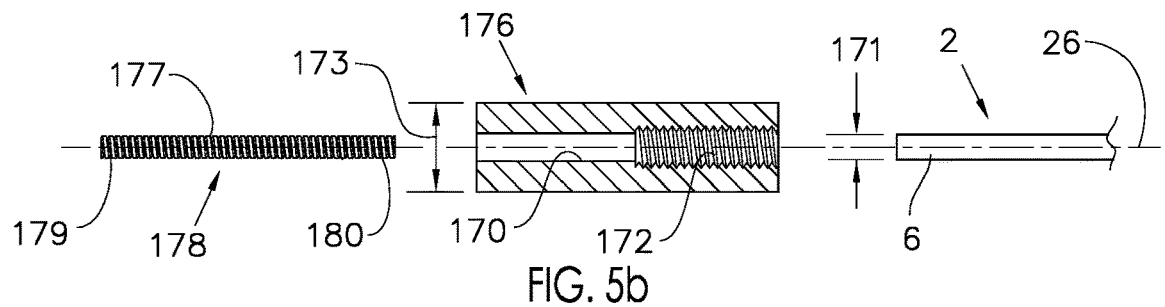
FIGS. 5b-d are partial cross-sectional views, taken along the tensile axis, and showing the embodiment of FIG. 5a in a sequence of operations involved in creating a connector assembly, including a crimped coupling collar.
Figure 5C:
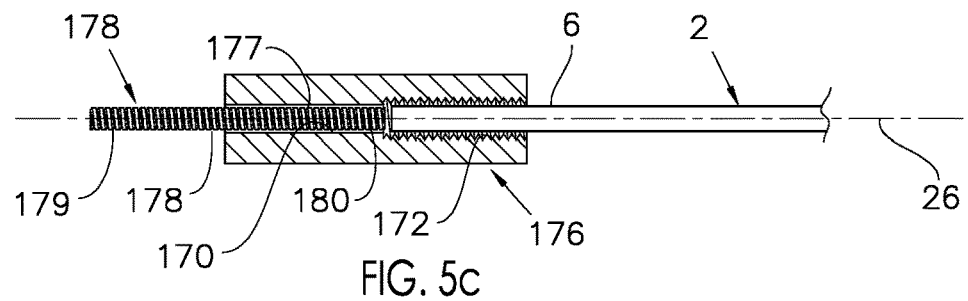

Spoke 2 is shown here to be generally round in cross-section and includes second end 6 and longitudinal axis 26. As shown in FIG. 5b, coupling collar 176 includes a smooth internal cavity 170 that is sized to provide a clearance fit with the outer surface of fastener 178. At its opposite end, coupling collar 176 includes a knurled or internally threaded hole 172 whose inside diameter is sized to provide a close clearance fit with the outside diameter 171 of the spoke 2. The knurled or internally threaded hole may be considered as a cavity with a configured internal surface. Cavity 170 is preferably collinear with hole 172. Coupling collar 176 also includes an external dimension 173. In the pre-assembly described in FIG. 5c, the first end 180 of fastener 178 is positioned in cavity 170 and the second end 6 of spoke 2 is positioned in hole 172.

Figure 5D:
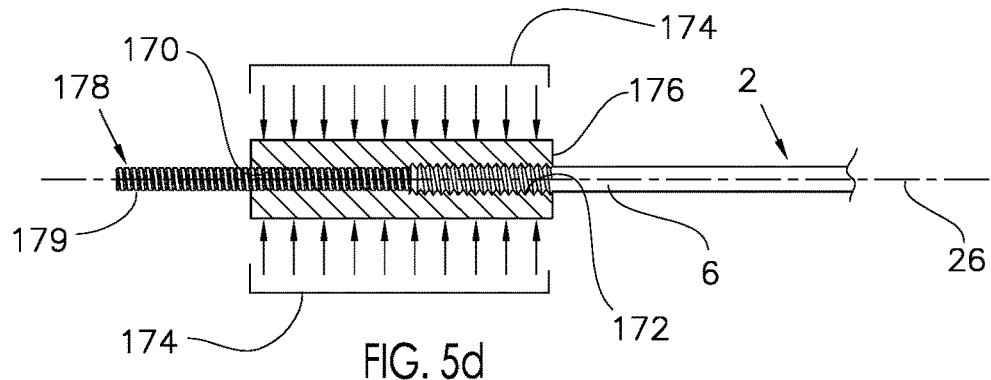
Figure 5E:
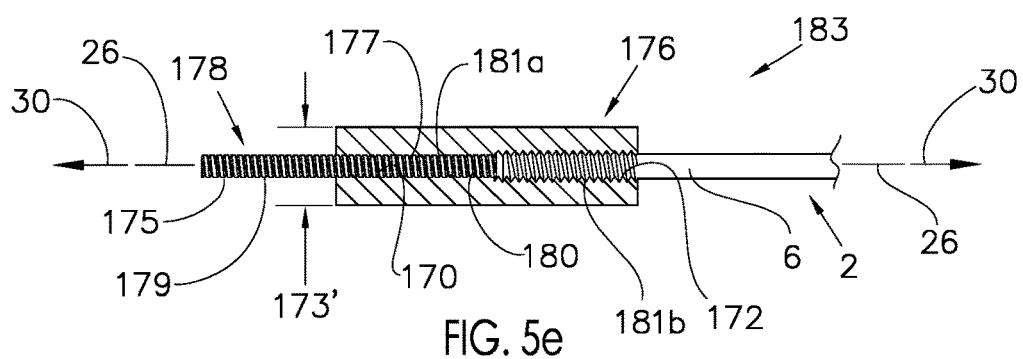
FIG. 5e is a partial cross-sectional view, taken along the tensile axis, and showing the embodiment of FIG. 5d, including applied tensile load between the spoke and fastener.

The coupling collar 176 is then swaged or crimped or otherwise deformed as shown in FIG. 5d where external crimping forces 174 are applied to the outside of the coupling collar 176. External forces 174, associated with the crimping or swaging processes, serve to press, deform and shrink the coupling collar 176 to a reduced external dimension 173', thereby shrinking cavity 170 into intimate contact with the first end 180 of the fastener 178 and shrinking hole 172 into intimate contact with the second end 6 of the spoke 2. As shown in FIG. 5d, when cavity 170 is shrunk onto fastener 178, the external threads of fastener 178 are pressed to impinge and deboss the walls of cavity 170, causing the cavity 170 to be plastically deformed to conform and mate with the external threads 177 of fastener 178 at an engagement interface 181a. The interlocking and gripping engagement at engagement interface 181a is a longitudinal engagement that occurs over a length along the longitudinal axis 26 as shown. Simultaneously, when hole 172 is shrunk onto the second end 6 of spoke 2, internal threads of hole 172 impinge and deboss the spoke 2 such that the spoke 2 is debossed and plastically deformed to conform and mate with the internal threads of hole 172 at an engagement interface 181b. The interlocking and gripping engagement at engagement interface 181b is also a longitudinal engagement that occurs over a length along the longitudinal axis as shown. Coupling collar 176 now has an interlocked and overlying engagement that mates and grips both the fastener 178 and the spoke 2 and an effective tensile connection is thereby achieved to support spoke tension 30 as shown in FIG. 5e. A spoke assembly 183 is thus achieved where the coupling collar 176, spoke 2, and fastener 178 are all joined together in a preferably permanent joinder. The spoke assembly 183 now includes an exposed portion 175 of the external thread 177 for threadable connection with a mating spoke nipple and for connection with the rim 8 (shown in FIGS. 4a-b). Coupling collar 176 may thus be considered a coupling that joins two tensile elements (i.e. fastener 178 and spoke 2).

External threads 177 are comprised of a helical external thread rib having an external thread flank as is known in industry and common to external threads. This external thread flank may be considered as a laterally outwardly projecting surface that helically circumscribes the longitudinal axis 26 and that extends in a generally longitudinal direction. When the external threads 177 are mated with the internal threads of a mating nipple, as described in FIG. 4b, the external thread flank has a laterally overlapping overlie engagement with a mating internal thread flank of the internal thread of the nipple. This overlie engagement supports spoke tension 30 load in the conventional manner. It may be considered that, since the fastener 178 is now combined and connected with the coupling collar 176, the external thread flank is now combined with the coupling collar 176.

A configured surface is defined herein as a region of variable surface geometry that usually includes raised surface(s) and adjacent recessed surface(s). Some examples of configured surfaces include surfaces that are threaded, knurled, ribbed, headed, raised, indented, warped, bent, etc. In this case, the external threads 177 may be considered as a configured surface, consisting of raised helical crests interspersed with relieved helical roots, which may also be viewed as a series of longitudinally spaced alternating raised surfaces and relieved surfaces projecting laterally from the sidewall of the spoke 2. Similarly, the internal threads of threaded hole 172 may be considered as a configured surface. The external threads of fastener 178 and the internal threads of hole 172 may be easily and economically produced using conventional tooling, but these threads are merely representative of configured debossing surfaces. Other configured surfaces may be substituted.

The debossed engagement between internal threads of hole 172 and spoke 2 and between external threads 177 and cavity 170 are effective to prevent relative movement between the fastener 178, the coupling collar 176, and the spoke 2 along the longitudinal axis 26. However, these debossed engagements rely only on friction to prevent relative rotation (about longitudinal axis 26) or unscrewing between these three components. To prevent such rotation and/or unscrewing, it is anticipated that the external threads 177 and/or internal threads of threaded cavity 170 include non-circular geometry (not shown) prior to crimping, such as a notch or distortion of these threads. Thus, the resulting engagement interfaces 181a and 181b will also include noncircular geometry such that these three components are rotationally keyed and locked to each other to prevent unscrewing.

While it may be beneficial to have an debossed engagement between the coupling collar 176 and the fastener 178 and/or the spoke 2, it is also envisioned that hole 172 and the second end 6 of spoke 2 may alternatively be smooth surfaces. In such a case, when the coupling collar 176 is shrunk as previously described, a frictional gripping engagement is created between the coupling collar 176 and the spoke 2.

Based on the deformation involved in this embodiment, it is desirable that the coupling collar 176 be made of a material whose hardness falls somewhere between the hardness of the fastener 178 and the hardness of the spoke 2. Fastener 178 is of greater hardness than coupling collar 176 and coupling collar 176 is of greater hardness than the second end 6 of spoke 2. It is generally understood that in most circumstances, when a softer material is pressed against a harder material, it is the softer material that will deform against a harder material. For example, the fastener 178 may be of stainless steel material and the coupling collar 176 may be of aluminum alloy and the second end 6 of the spoke 2 may be of fiber-reinforced polymer, including reinforcement fibers 85. Stainless steel has greater hardness than aluminum alloy and aluminum alloy has greater hardness than fiber reinforced polymer.

It should be understood that plastic deformation involves the yielded deformation of a material due to pressure or load. This is in contrast to elastic deformation, in which the material springs back to its original shape when the applied pressure or load is removed. It may be considered that a the coupling collar 176 is made of a malleable or ductile material that exhibits at least some degree of plastic deformation when it is pressed by crimping forces 174 as described in FIG. 5d. Similarly, the second end 6 of spoke 2 is made of malleable or ductile material such that it is deformed when pressed by the coupling collar 176.

In addition to the description of FIGS. 5a-e, the term "crimp" or "crimped joinder" is used throughout this disclosure to refer to the process of pressing a malleable or ductile connecting element (i.e. coupling collar 176) to plastically crush, shrink or reduce at least one of its dimensions. This may be achieved through a range of processes, such as crimping or swaging that are well known in industry. Most commonly the connecting element includes an external surface and an internal cavity (i.e. cavity 170 and threaded hole 172). This crimping process involves pressing and plastically shrinking a dimension of the external surface of the connecting element to induce the shrinkage of a corresponding dimension of the internal cavity. Through this shrinkage of the internal cavity, the connecting element may be engaged to the spoke.

Figure 6A:
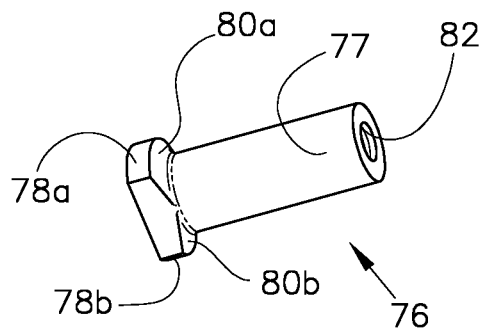
FIG. 6a is a perspective view of a connector of an additional embodiment of the present invention, where the connector includes a blind hole to receive the spoke and two laterally opposed engagement surfaces.
Figure 6B:
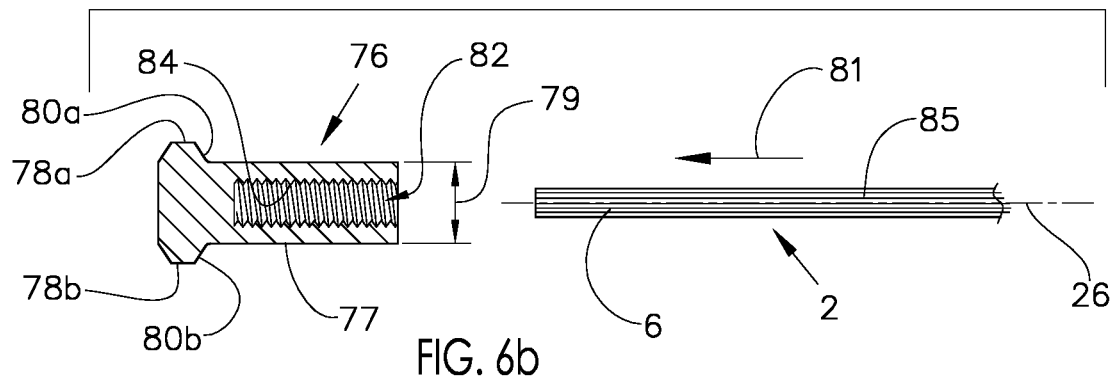
FIGS. 6b-c are partial cross-sectional views of the embodiment of FIG. 6a, taken along the tensile axis, with the connector serving as a termination for a tensile element, and showing the sequence of operations involved in creating a crimped connection between the spoke and connector.
Figure 6C:
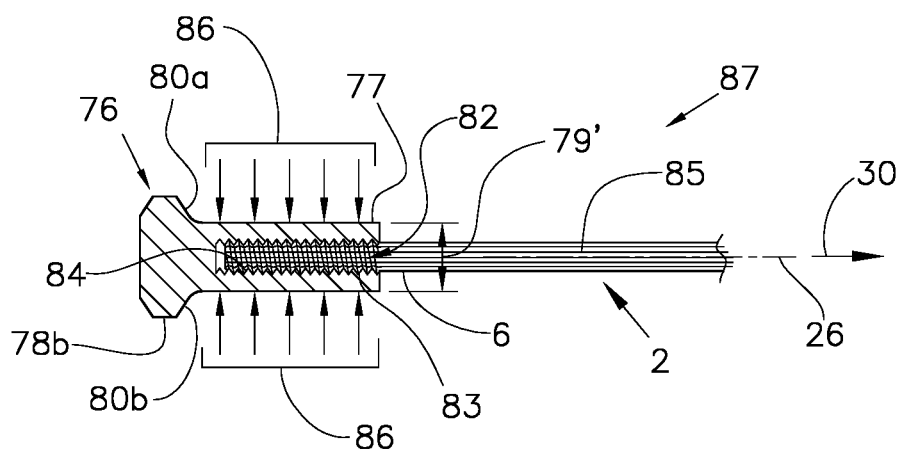

The embodiment of FIGS. 6a-c describes an exemplary joining means corresponding to the embodiment of FIGS. 3a-b and describes how a connector may be crimped and plastically deformed to grip the second end 6 of a spoke 2. As shown in FIGS. 6a-c, connector 76 includes a cylindrical shank portion 77 with external dimension 79 and two projections 78a and 78b with a corresponding transition surfaces 80a and 80b. Transition surfaces 80a and 80b project laterally outwardly from shank portion 77 and are laterally opposed to each other. Transition surfaces 80a and 80b each only partially circumscribe the shank portion 77 about the axial axis 26. Connector 76 also includes a blind cavity or hole 82 with a configured internal surface consisting of internal threads 84. Spoke 2 is shown here to be generally round in cross-section and includes longitudinal axis 26 and second end 6, which is sized to have a clearance fit with hole 82. As shown in FIG. 6b, the second end 6 is first aligned with hole 82. Next, the spoke 2 is inserted into hole 82 in direction 81 and positioned such that the connector 76 overlaps the spoke 2 along the longitudinal axis 26 to create a pre-assembly between the spoke 2 and the connector 76.

The connector 76 is made of a harder material, such as aluminum and the spoke 2 is made of a softer material, such as fiber reinforced polymer. Thus the softer spoke 2 may be deformed to conform to the harder connector 76. It is further anticipated that the surface of the spoke 2 may include a coating of softer material that will serve as a readily deformable layer such that this layer will be more easily be deformed upon impingement by the connector 76. In an exemplary arrangement, the spoke 2 may be made of thermoplastic polymer resin with continuous carbon reinforcement fibers 85 that extend through the entire length of the spoke 2 and with a resin-rich external surface.

Next, as shown in FIG. 6c, the connector 76 is crimped onto the spoke 2 with external crimp force 86 applied to press the shank portion 77 of the connector 76 in a direction perpendicular to the longitudinal axis 26 to cause the shank portion 77 to plastically deform and laterally shrink to a reduced external dimension 79'. This deformation of the shank portion 77 causes the blind hole 82 to shrink such that the harder internal threads 84 press and impinge the second end 6 of the spoke 2 such that the softer ductile second end 6 is debossed and deformed (both plastically and elastically) to conform to the contour of internal threads 84. Thus, spoke 2 is has an overlie engagement with the internal threads 84 and is also gripped by the connector 76 at engagement interface 83 to securely join the connector 76 to the spoke 2 and to prevent relative movement between the two along the longitudinal axis 26. A spoke assembly 87 is thus achieved where the spoke 2 is now joined to the transition surface 80 for connection with a rim 8 in an overlie engagement (as shown in FIGS. 3a-b). Engagement interface 83 may be considered a longitudinal engagement interface as it occurs over a longitudinal length of the spoke 2. The connector 76 may then be connected to the rim 8 as described in FIGS. 3a-b or may alternatively be connected to the hub. Connector 76 may thus be considered a termination that provides anchoring at the end of the spoke 2 to resist spoke tension forces.

In reviewing the embodiment of FIGS. 6a-c, as well as several other embodiments described herein, it may be seen that, during crimping, the softer one of the spoke and connector may deform to conform to the configured surface of the harder one of the spoke and connector such that, upon the crimped shrinking of the connector, the softer component now has a series of longitudinally spaced alternating raised surfaces and relieved surfaces that are nested and matched with the corresponding surfaces of the harder component. These nested and matched surfaces constitute a series of interlocking mechanical overlie engagements between the spoke and the connector to lock the connector to the spoke in a direction along the longitudinal axis so that the resultant joinder may resist spoke tension 30. The series of mechanical overlie engagements are preferably arranged generally along the longitudinal axis 26 of the spoke as shown to serve as a longitudinal engagement as previously described and to provide a more robust joinder between the connector and the spoke. Thus, the connector is solidly locked and joined to the spoke to support spoke tension 30. It is understood that the configured surface is also merely representative of a wide range of spoke cross section and surface geometries, both constant and variable along the longitudinal axis 26, that may be utilized to enhance the performance and design of the spoke/connector joinder. For example, the configured surface may be knurled, notched, threaded, flattened, fluted, ribbed, necked, headed and/or tapered, among other geometries. Further, it is also envisioned that one or both of the spoke and connector may include matched non-circular cross section geometry such that the connector and spoke may be keyed to each other to prevent or limit independent rotational movement about the longitudinal axis.

Figure 6D:
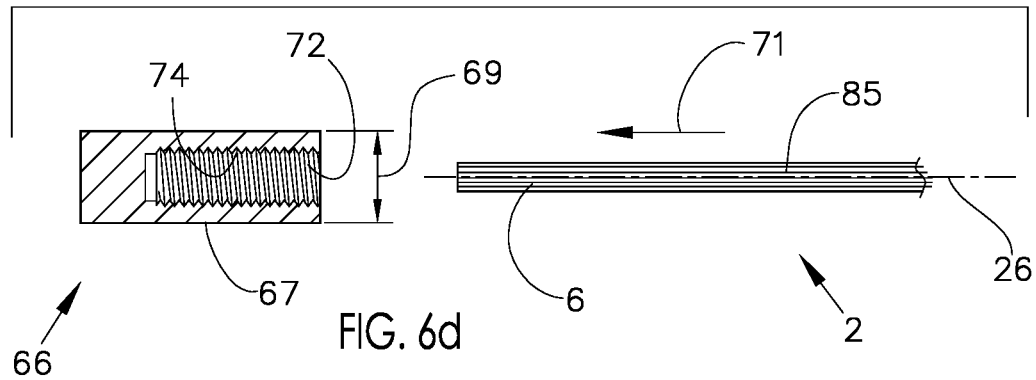
FIGS. 6d-e are partial cross-sectional views, taken along the tensile axis, and showing an additional embodiment of the present invention in a sequence of operations involved in connecting a connector to a spoke, where the crimped deformation of the connector serves to provide an engagement surface of the connector.
Figure 6E:
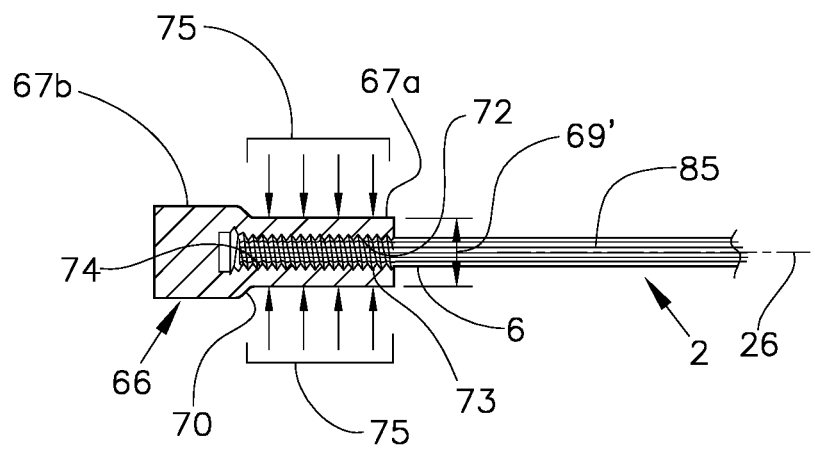
Figure 6F:
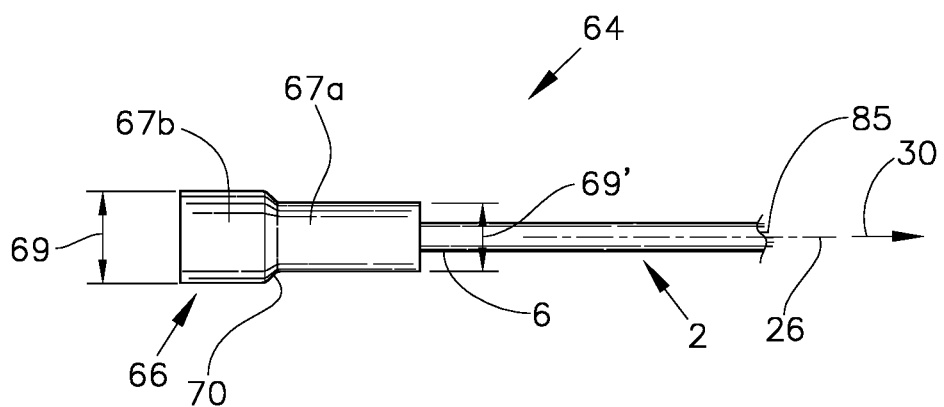
FIG. 6f is an orthogonal view of the embodiment of FIGS. 6d-e, corresponding to the crimped connection of FIG. 6e.

The embodiment of FIGS. 6d-f describes an exemplary joining means corresponding to the embodiment of FIGS. 3a-b and describes how a connector may be crimped and plastically deformed to grip the second end 6 of a spoke 2. As shown in FIGS. 6d-f, connector 66 includes a cylindrical outer surface 67 with external dimension 69. Connector 66 also includes a blind cavity or hole 72 with a configured internal surface consisting of internal threads 74. Spoke 2 is shown here to be generally round in cross-section and includes longitudinal axis 26 and second end 6, which is sized to have a clearance fit with hole 72. As shown in FIG. 6d, the second end 6 is first aligned with hole 72. Next, the spoke 2 is inserted into hole 72 in direction 71 and positioned such that the connector 66 overlaps the spoke 2 along the longitudinal axis 26 to create a pre-assembly between the spoke 2 and the connector 66.

The connector 66 is made of a harder material, such as aluminum, and the spoke 2 is made of a softer material, such as fiber reinforced polymer. Thus the softer spoke 2 may be deformed to conform to the harder connector 66. It is further anticipated that the surface of the spoke 2 may include a coating of softer material that will serve as a readily deformable layer such that this layer will be more easily be deformed upon impingement and debossing by the connector 66. In an exemplary arrangement, the spoke 2 may be made of thermoplastic polymer resin with continuous carbon reinforcement fibers 85 that extend through the entire length of the spoke 2 and with a resin-rich external surface.

Next, as shown in FIG. 6e, the connector 66 is crimped onto the spoke 2 with external crimp force 75 applied to press a portion of the external surface 67 of the connector 66 in a direction perpendicular to the longitudinal axis 26 to cause that portion of the outer surface 67 to plastically deform and laterally shrink to a reduced external dimension 69'. This deformation of the outer surface 67 causes the blind hole 72 to shrink in a region aligned with the crimp force 75 such that the harder internal threads 74 press and impinge the second end 6 of the spoke 2 such that the softer ductile second end 6 is debossed and deformed to conform to the contour of internal threads 74. Thus, spoke 2 is has an overlie engagement with the internal threads 74 and is also gripped by the connector 66 at engagement interface 73 to securely join the connector 66 to the spoke 2 and to prevent relative movement therebetween along the longitudinal axis 26.

Concurrent with the shrinking of blind hole 72, the external surface 67 is also deformably shrunk in a localized region adjacent the applied crimp force 75 to create a deformed portion 67a with a deformed external dimension 69' as shown in FIGS. 6e and 6f. This leaves an undeformed portion 67b of the external surface 67 that is longitudinally offset from the deformed portion 67a with an external dimension 69. This deformation of the outer surface 67 also creates a transition surface 70 between the deformed portion 67a and the undeformed portion 67b. Transition surface 70 may be considered as a laterally outwardly projecting overlie engagement surface that may be utilized to provide an overlie engagement with a bracing element in a manner similar to transition surface 32 described in FIGS. 3a-b.

A spoke assembly 64 is thus achieved where the spoke 2 is now joined to the transition surface 70 for connection with a rim 8 in an overlie engagement. Engagement interface 73 may be considered a longitudinal engagement interface as it occurs over a longitudinal length of the spoke 2. The connector 66 may then be connected to the rim 8 as described in FIGS. 3*a-b* or may alternatively be connected to the hub. Connector 66 may thus be considered a termination that provides anchoring at the end of the spoke 2 to resist spoke tension forces 30.

Figure 7A:
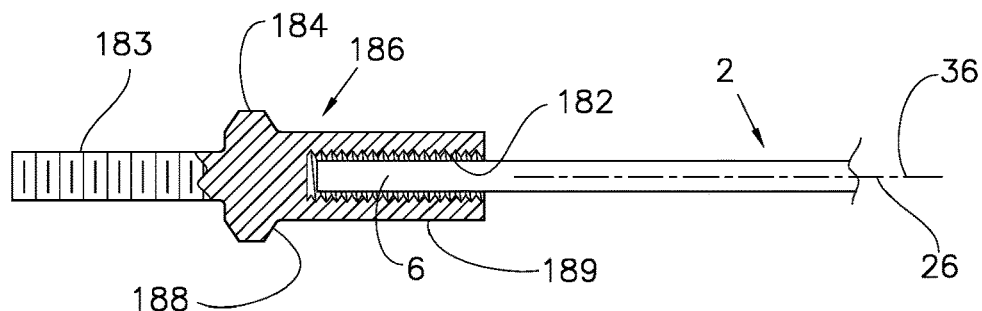
FIGS. 7a-b are partial cross-sectional views of an additional embodiment of the present invention, taken along the tensile axis, with the connector including an integral fastener portion, and showing the sequence of operations involved in creating a crimped connection between the spoke and connector.
Figure 7B:
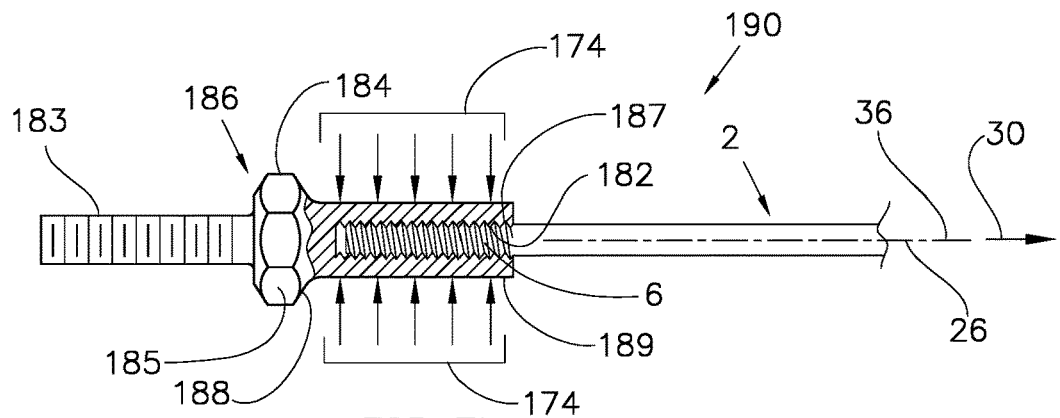

FIGS. 7*a-b* describe an embodiment similar to FIGS. 5*a-e*, however the fastener portion 183 is shown here to be integral with the connector 186. The term "integral" refers to the fastener portion 183 and connector 186 as pre-combined as a single unit. As shown in FIG. 7*a*, connector 186 includes a configured surface consisting of a blind threaded hole 182 whose inside diameter is sized to provide a close clearance fit with the outside diameter of the second end 6 of spoke 2. Connector 186 includes an integral male-threaded fastener portion 183, an enlarged portion 184 with hex flats 185, a flared shoulder 188 and a shank 189.

The connector 186 is then swaged or crimped, as shown in FIG. 7*b*, where external crimping forces 174 are applied to press the outside of shank 189 in a direction perpendicular to the longitudinal axis 26. Swaging or crimping forces 174 serve to shrink the shank 189, thereby shrinking hole 182 into intimate contact with the second end 6 of the spoke 2 at engagement interface 187 in a manner previously described in FIGS. 5*a-e* and FIGS. 6*a-b*. An effective connection between the connector 186 and the spoke 2 is thereby achieved. A spoke assembly 190 is thus achieved where the spoke 2 is now joined to the fastener portion 183 for connection with a spoke nipple in an overlie threadable engagement in a manner similar to that shown in FIGS. 4*a-b*. An intermediate connecting component, such as a spoke nipple (as described hereinabove), may be threaded onto the fastener portion 183 for connection to a bracing element such as the rim or hub flange (not shown). Alternatively, the fastener portion 183 may be directly threaded to engage the bracing element. Connector 186 may now serve as a connecting element to connect the spoke 2 to a bracing element. Hex flats 185 formed into enlarged portion 184 allow the connector 186 to be rotatably manipulated about the longitudinal axis 26 with a wrench or other tool. Alternatively the flared shoulder 188 may be utilized to create an overlie engagement to engage the rim or hub flange in a manner similar to a spoke nipple or in a manner similar to that described in FIGS. 4*a-b*.

Figure 7C:
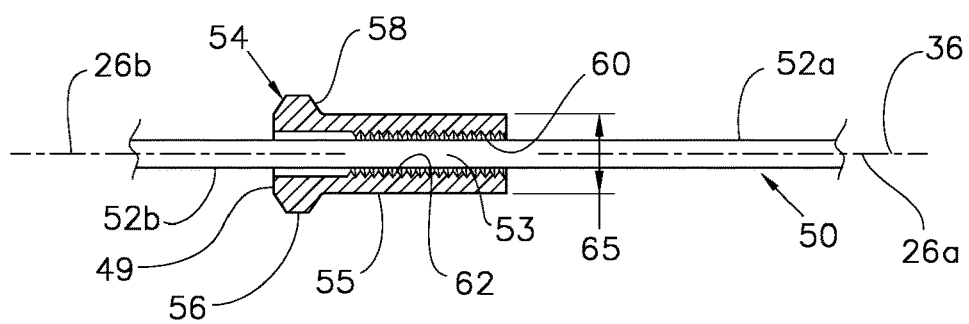
FIGS. 7c-d are partial cross-sectional views of an additional embodiment of the present invention, taken along the tensile axis, including a duplex spoke, and showing the sequence of operations involved in creating a crimped connection between the duplex spoke and the connector.
Figure 7D:
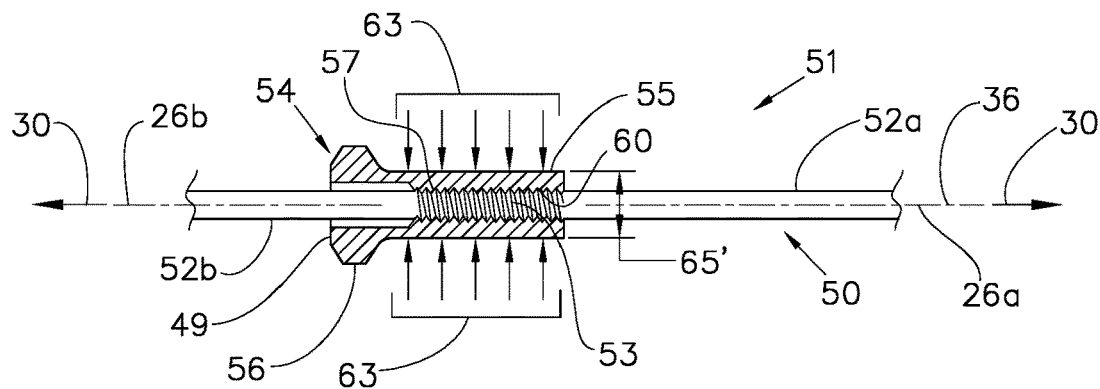

The embodiment of FIGS. 7*c-d* is similar to the embodiment of FIG. 6*a-b*, however, unlike the spoke 2, which may comprise only a single span, spoke 50 is shown to include two spans. As shown in the embodiment of FIGS. 7*c-d*, connector 54 includes a shank portion 55 of lateral dimension 65 and an enlarged head portion 56 with a transition surface 58 therebetween and an end face 49. End face 49 and/or transition surface 58 may serve as a laterally outwardly projecting engagement surface for overlie engagement and connection with a bracing element (not shown). Connector 54 also includes a through hole 60 with internal threads 62 comprising a configured surface. Spoke 50 is generally round in cross-section and is shown here to be a duplex spoke 50 to include a first span 52*a* and a second span 52*b*, with a common portion 53 therebetween. Each span 52*a* and 52*b* includes a corresponding longitudinal axis 26*a* and 26*b* respectively. As shown in FIG. 7*c*, the common portion 53 is first positioned within hole 60 such that the connector 54 overlaps the spoke 50 along the longitudinal axis 26*a* and 26*b*. The connector 54 is made of a harder material, such as aluminum and the spoke 50 is made of a softer material, such as fiber reinforced polymer.

Next, as shown in FIG. 7*d*, the connector 54 is crimped onto the common portion 53 of the spoke 50 with external crimp force 63 applied to the shank portion 55 of the connector 54 to cause shank portion 55 to plastically deform and shrink laterally inwardly to a reduced lateral dimension 65'. This deformation of the shank portion 55 causes the through hole 60 to shrink such that the harder internal threads 62 press and impinge the common portion 53 of the spoke 50 and the softer ductile common portion 53 is deformed and debossed to conform to the contour of internal threads 62. Thus, spoke 50 has an interlocking overlie engagement with the internal threads 62 and is also gripped by the connector 54 at engagement interface 57 to securely join and lock the connector 54 to the spoke 50 to resist spoke tension 30 loads. A completed spoke assembly 51 is thus achieved where the spoke 2 is connected to The connector 54 may then be connected to the hub (not shown) or may alternatively be connected to the rim 8. U.S. Pat. No. 7,192,097 discloses several representative arrangements where a duplex spoke, such as described in FIGS. 7*c-d*, may be incorporated into a vehicle wheel. The connector 54 may alternatively employ a variety of functional geometries that may be designed to provide connection with the rim and/or hub.

FIGS. 8*a-d* describe a representative crimping method. This example shows how the connector 100 may be crimped by applying a crimping force perpendicular to the longitudinal axis of the spoke 2. As shown in FIG. 8*a*, connector 100 includes an outer surface 101 of height 116 and an internal hole or cavity 103. Spoke 2 is pre-assembled within cavity 103 with clearance 105 between the outside diameter of the spoke 2 and the diameter of the cavity 103. Connector 100 is shown to completely surround and enclose the cross-section of the spoke 2. As shown in FIG. 8*b*, punch 108 includes a punch face 110 and nest 112 includes a nest face 114. The pre-assembly is placed between a punch face 110 and nest face 114.

Next, as shown in FIG. 8*c*, punch 108 is pressed and driven in direction 106, which is perpendicular to the longitudinal axis, toward the nest 112 and against the connector 100 to sandwich and shrink the connector 100 into intimate contact with the spoke 2. As punch face 110 and nest face 114 are brought toward each other to press against the connector 100 from opposing directions, the connector 100 becomes crimped such that the height 116 of the connector 100 is reduced and shrunk and the cavity 103 contacts and impinges against the spoke 2. The connector 100 is made of ductile and malleable material such that it is plastically deformed (due to crimping force) to maintain this reduced height 116. The spoke is also preferably made of malleable and ductile material. Simultaneously, as the cavity 103 impinges against the spoke 2, the cross sectional shape of the spoke 2 may deform against the cavity 103, as shown in FIG. 8*c*, to create a matched surface interface between the spoke 2 and the cavity 103 at engagement interface 117. With the cavity 103 shrunk against the spoke 2, the spoke 2 becomes gripped and joined to the connector 100. It is also noted that connector 100 continuously surrounds the cross section of the spoke 2. The punch 108 and nest 112 are removed, as shown in FIG. 8*d*, and it may be seen that this new joinder between connector 100 and spoke 2 may now be used as a termination or a coupling to support spoke tension loads.

It may be seen in FIG. 8*d* that the outer surface 101 is now non-circular about the longitudinal axis (not shown, but extending into the paper) and has been squeezed into a generally elliptical peripheral contour. As this outer surface 101 is noncircular, it may be gripped and/or engaged with a mating wrench or other tool to facilitate manual manipulation of the connector 100 about the longitudinal axis.

The crimping method of FIGS. 9a-c is very similar to that of FIGS. 8a-d, however this method includes pinching of the connector 120. As shown in FIG. 9a, connector 120 includes an outer surface 121 of height 136 and an internal hole or cavity 123. Spoke 2 is pre-assembled within cavity 123 with clearance 125 between the outside diameter of the spoke 2 and the diameter of the cavity 123. Punch 128 includes a punch face 130 and nest 132 includes a nest face 134. The pre-assembly is placed between a punch face 130 and nest face 134.

Next, as shown in FIG. 9b, punch 128 is pressed in direction 126 toward the nest 132 to sandwich and shrink the connector 120 into intimate contact with the spoke 2. As punch face 130 and nest face 134 are brought toward each other to press against the connector 120 from opposing directions (perpendicular to the longitudinal axis), the height 136 of the connector 120 is reduced and shrunk such that the cavity 123 contacts and impinges against the spoke 2. The connector 120 is made of ductile and malleable material such that it is plastically deformed to maintain its reduced height 136 and to create a matched surface interface between the spoke 2 and the cavity 123 at engagement interface 127. As shown in FIG. 9b, the connector 120 is also puckered slightly to create pinched folds 137a and 137b, which allow the connector 120 to collapse to a high degree to grip the spoke 2. It is noted that the spoke 2 still maintains a generally round cross section after crimping and its cross-section does not undergo such a dramatic deformation as previously described in FIGS. 8a-d. With the cavity 123 shrunk against the spoke 2, the spoke 2 becomes connected to the connector 120. The punch 128 and nest 132 are removed, as shown in FIG. 9c, and it may be seen that this new connection may now be used as a termination or a coupling to support spoke tension loads.

FIGS. 10a-c describe a representative crimping method similar to that of FIGS. 8a-d. This example shows how the connector 230 may be crimped by applying a force perpendicular to the longitudinal axis of the spoke 2. As shown in FIG. 10a, connector 230 includes an outer surface 231 and an internal hole or cavity 233. Spoke 2 is pre-assembled within cavity 233 with clearance 235 between the outside diameter of the spoke 2 and the diameter of the cavity 233. As shown in FIG. 10b, and in contrast to the semi-circular faces 110 and 114 of FIGS. 8b-c, punches 237a and 237b include faceted punch faces 238a and 238b respectively. The pre-assembly is placed between punch faces 238a and 238b. Punches 237a and 237b are then pressed toward each other in directions 239a and 239b to sandwich and shrink the connector 230 into intimate contact and impingement with the spoke 2 at engagement interface 236. As punch faces 238a and 238b are brought toward each other, the faceted punch faces 238a and 238b serve to press, forge and plastically deform the outer surface 231 into a non-circular hexagonal shape as shown in FIG. 10c. This hexagonally faceted deformation also provides a variable deformation around the cross sectional circumference of the connector 230 where the flats 240 correspond to a region of greater radial inward deformation and the peaks 242 correspond to a region of lesser radial inward deformation. This localized deformation may require lower crimping forces on the punches. Further, in comparison with the circular outer surface 141 of FIGS. 11a-c, the hexagonal shape of the outer surface 231 allows the connector to be easily manipulated or rotated with a tool such as a wrench (not shown). As also described in FIGS. 8a-d it may be seen that this crimped and deformed connection between the spoke 2 and the connector 230 may now be used as a termination or a coupling to support spoke tension loads.

The crimping method of FIGS. 11a-c is very similar to that of FIGS. 8a-d, however instead of crimping the connector 100 from two opposing directions, the connector 140 is pressed from six radially inwardly directions. As shown in FIG. 11a, connector 140 includes an outer surface 141 and an internal hole or cavity 143. Spoke 2 includes notch 144 in its cross-section and is pre-assembled within cavity 143 with clearance 145 between the outside diameter of the spoke 2 and the diameter of the cavity 143. A series of six punches 148, each include a punch face 150, are arranged in a radial configuration as shown. The pre-assembly is centrally placed within the series of punches 148.

Next, as shown in FIG. 11b, punches 148 are each pressed radially inwardly in respective radial directions 146 (perpendicular to the longitudinal axis) to sandwich and shrink the connector 140 into intimate contact with the spoke 2. As punch faces 150 are brought toward each other to radially press against the connector 140, the diameter 149 of the connector 140 is crimped and shrunk such that the cavity 143 contacts and impinges against the spoke 2. The connector 140 is made of ductile and malleable material such that it is thus plastically deformed to maintain its reduced diameter 149 and to create a matched surface interface between the spoke 2 and the cavity 143 at engagement interface 147. Material of the connector 140 is simultaneously pressed to conform to the notch 144 such that the engagement interface 147 is non-circular in cross-section and the connector 140 is rotationally keyed to the spoke 2 about the longitudinal axis. It is noted that the spoke 2 still maintains its original cross-section after crimping and does not undergo a shape deformation as previously described in FIGS. 8a-d. With the cavity 143 shrunk against the spoke 2, the spoke 2 becomes joined to the connector 140. The punches 148 are removed and it may be seen that this new connection can be used as a termination or a coupling to support spoke tension loads, as shown in FIG. 11c.

The circumferential crimping method of FIGS. 12a-b is similar to that of FIGS. 9a-c, however instead of the connector 120 being radially squeezed from two opposing directions to sandwich the spoke 2, the connector 152 is wrapped to circumferentially constrict around the cross section of the spoke 2. As shown in FIG. 12a, connector 152 includes an outer surface 153 and an internal hole or cavity 154 and a longitudinal split or gap 158 with corresponding edges 156a and 156b. Thus, in contrast to several other embodiments herein, such as FIGS. 8a-d, connector 120 does not continuously surround the cross section of the spoke 2. Spoke 2 is pre-assembled within cavity 154 with clearance 155 between the outside diameter of the spoke 2 and the diameter of the cavity 154. Crimping dies are not shown, but may be of any configuration known in industry.

Next, as shown in FIG. 12b, a crimping or swaging method serves to circumferentially deform the connector 152 in directions 160a and 160b, thus serving to shrink and reduce the diameter 162 of the outer surface 153 and to constrict the cavity 154 into intimate contact and impingement with the spoke 2 at engagement interface 157. It may be seen that the gap 158 is now reduced in response to the circumferential constriction of the connector 152. The connector 152 is made of ductile and malleable material such that it is thus plastically deformed to maintain its reduced diameter 162 and to create a matched surface interface between the spoke 2 and the cavity 154. The width of gap 158 is also reduced and edges 156a and 156b are brought toward each other. With the cavity 154 shrunk against the spoke 2, the spoke 2 becomes connected to the connector 152. It may be seen that this new connection can be used as a termination or a coupling to support spoke tension loads. It should be noted that, while all of the previous embodiments utilize a connector that continuously surrounds the cross section of the spoke, the embodiment of FIGS. 12a-b shows an example where the connector 152 discontinuously surrounds the cross section of the spoke 2.

FIG. 12c describes an alternate crimping engagement similar to that described in FIG. 12b. In addition to the circumferential crimping described in FIG. 12b, this crimping method further serves to disrupt edges 156a and 156b inwardly as shown to impinge against the spoke 2. Such a crimping method is known in industry. Further, the edges 156a and 156b may be serrated such that when they impinge against the spoke 2 as shown, the outer surface of the spoke will deform to conform to the points of the serrations, thus creating an overlie engagement at the engagement interface to lock the connector 152 to the spoke 2 to support spoke tension forces.

In the previously described embodiments of the present invention, the spoke 2 is assembled to the connector in a generally longitudinal direction. This is because, in the non-deformed state, the connector encloses the cross-section of the spoke. In contrast, the crimping method of FIGS. 13a-b shows how the spoke 254 may be assembled to the connector 246 in a direction 258 that is generally perpendicular to the longitudinal axis 26 of the spoke 254.

As shown in FIG. 13a, connector 246 has is a generally U-shaped element with a longitudinal opening 252, a base portion 250 and two tab portions 248a and 248b. Spoke 254 includes a configured portion 256, where the configured portion 256 may constitute a knurled surface, a threaded surface, a ribbed surface (as shown), or any other type of surface with variable geometry. The spoke 254 is first pre-assembled to the connector 246 in direction 258 and through the opening 252 such that the configured portion 256 is nested against the base 250.

Next, as shown in FIG. 13b, connector 246 is pressed and crimped with external crimp force 259 applied to tab portion 248a as shown. It may be seen that the opening 252 is then closed and tab portion 248a is now circumferentially wrapped in directions 257a and 257b around the cross section of the spoke 254. The interior surfaces 255 of the base 250 and tabs 248a and 248b are now constricted to circumferentially press around the configured surface 256 in a manner similar to that described in FIGS. 12a-b. Tab portions 248a and 248b are pressed together to meet at pinched seam 249, which may be considered as a longitudinal split. The connector 246 is made of ductile and malleable material such that it is plastically deformed in response to crimp force 259 to maintain this closed configuration.

In this embodiment, the connector 246 is made of a softer material, such as aluminum and the spoke 254 is made of a harder material, such as steel. During the crimped deformation, softer ductile interior surfaces 255 of the connector 246 are pressed and impinged against the harder configured portion 256 of the spoke 254 such that the interior surface 255 is deformed to conform to the contour of the configured surface 256 in a manner similar to that described in FIGS. 6c-d. There is now a matched surface interface and a corresponding overlie engagement between the configured surface 256 and the interior surface 255 of the connector 246. Thus the spoke 254 is securely joined to the connector 246 to resist spoke tension 30 loads.

Figure 14A:
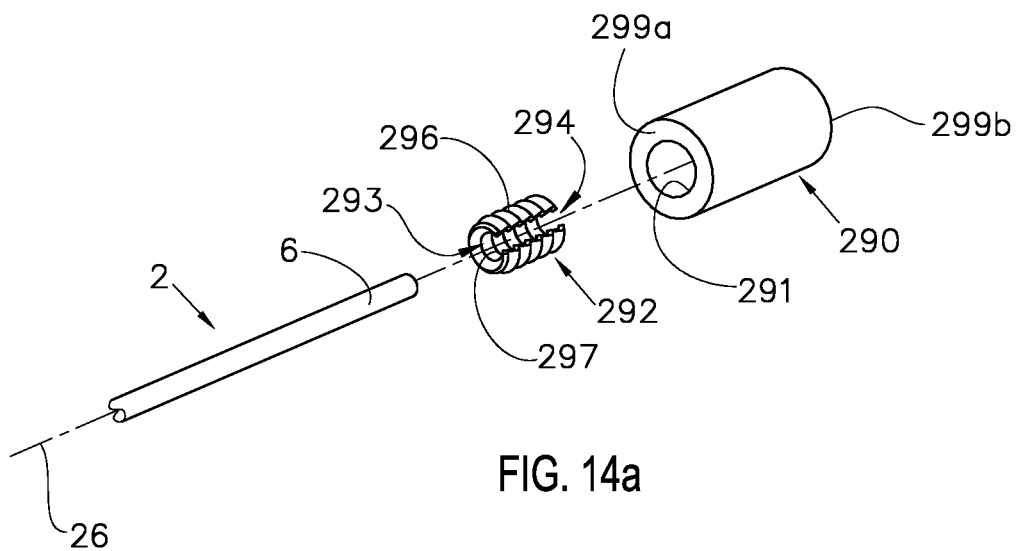
FIG. 14a is a partial perspective view of an additional embodiment of the present invention, in exploded assembly, including an intermediate joining element located between the spoke and the connector.
Figure 14B:
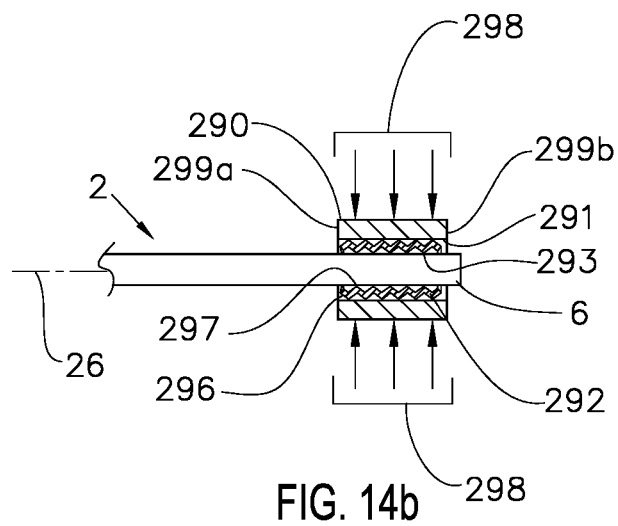
FIGS. 14b-c are partial cross-sectional views of the embodiment of FIG. 16, taken parallel to the tensile axis, showing the progressive sequence of operations involved in creating a crimped connection between the spoke and the connector, including the intermediate joining element therebetween.
Figure 14C:
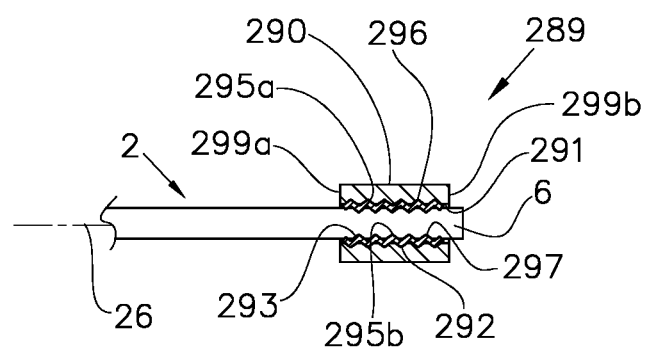

The embodiment of FIGS. 14a-c includes elements of the embodiments of FIGS. 6c-d and FIGS. 12a-b. As shown in FIG. 14a, connector 290 is made of malleable and ductile material and includes longitudinal through hole 291 and end faces 299a and 299b. Collar 292 includes longitudinal split 294 and external ribs 296 and a longitudinal through hole 293 with internal ribs 297. External ribs 296 and internal ribs 297 may both be considered as configured surfaces. The material of the collar 292 is harder than both the material of the connector 290 and the material of the second end 6 of the spoke 2. For example, the connector 290 may be comprised of malleable aluminum and the collar 292 may be hard steel and the spoke 2 may be fiber reinforced polymer.

As shown in FIG. 14b, the collar 292 is first pre-assembled to overlap both the spoke 2 and the connector 290 along the longitudinal axis 26. The connector 290 is then swaged or crimped with external crimping forces 298 applied to the outside of the connector 290. Crimping forces 298, due to the crimping or swaging processes, serve to plastically deform and shrink the connector 290 laterally inwardly as described previously, thereby shrinking hole 291 into intimate contact and impingement with the collar 292, which in turn is shrunk (by circumferentially collapsing the split 294) such that hole 293 is shrunk and brought into intimate contact and impingement with the second end 6 of the spoke 2. Thus, as seen in FIG. 14c, external ribs 296 are debossed and embedded within the hole 291 of the connector 290 at engagement interface 295a such that the connector 290 and the collar 292 are engaged and locked together. Simultaneously, internal ribs 297 deboss and embed into the external surface of the second end 6 of the spoke 2 at engagement interface 295b such that the collar 292 and spoke 2 are engaged and locked together. Connector 290 and spoke 2 are now joined together my means of this intermediate collar 292. Generically, it may be viewed that collar 292 serves as an "intermediate joining element" where the connector 290 is deformed to join to the collar 292 and the collar 292 is also thereby deformed to join to the spoke 2, thus creating an effective deformed joinder between the connector 290 and the spoke 2. A spoke assembly 289 is achieved such that spoke 2 is now joined to the end faces 299a and 299b, which may be considered as laterally outwardly projecting engagement surfaces for overlie engagement with a bracing element such as a rim or hub flange in a manner similar that previously described. It is noted that the geometry of the connector 290 and spoke are shown as generic cylindrical shapes for description purposes. Alternatively, a wide variety of geometries and arrangements may be incorporated into the design that may add to the functionality and/or aesthetics of the system. As a further alternative, it is also envisioned that the collar 292 may include geometry that is external to the connector 290 that may also be utilized to connect to a bracing element (not shown).

Figure 15A:
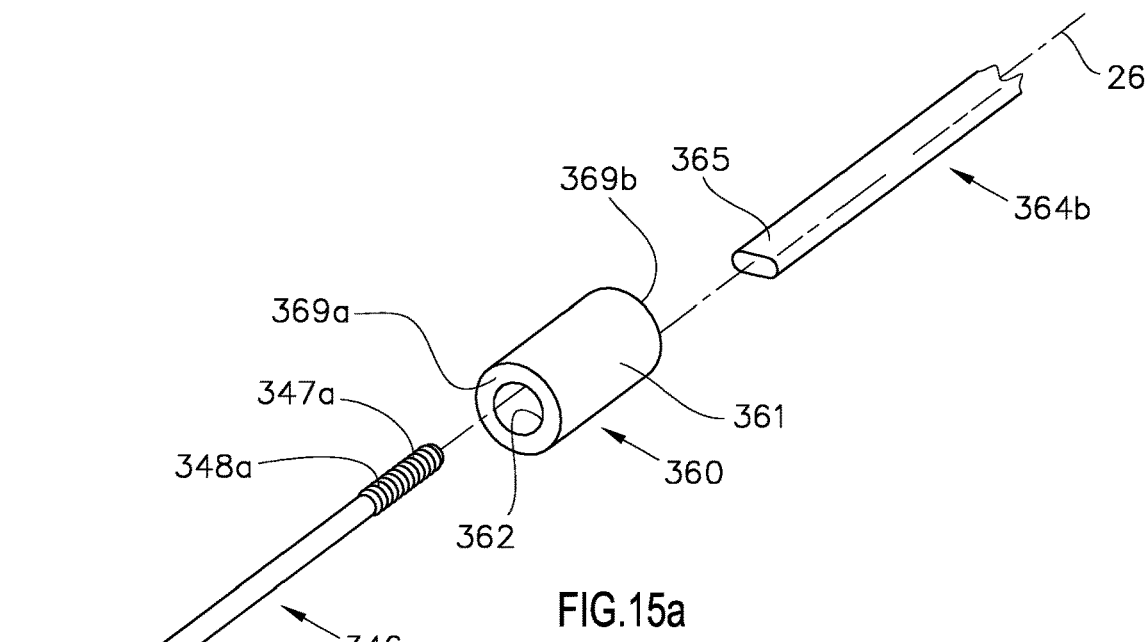
FIGS. 15a-c are partial perspective views of an additional embodiment of the present invention, showing the progressive sequence of operations involved in creating a crimped connection between a spoke and a connector, in a coupling arrangement where two spokes are deformably joined to each other.
Figure 15B:
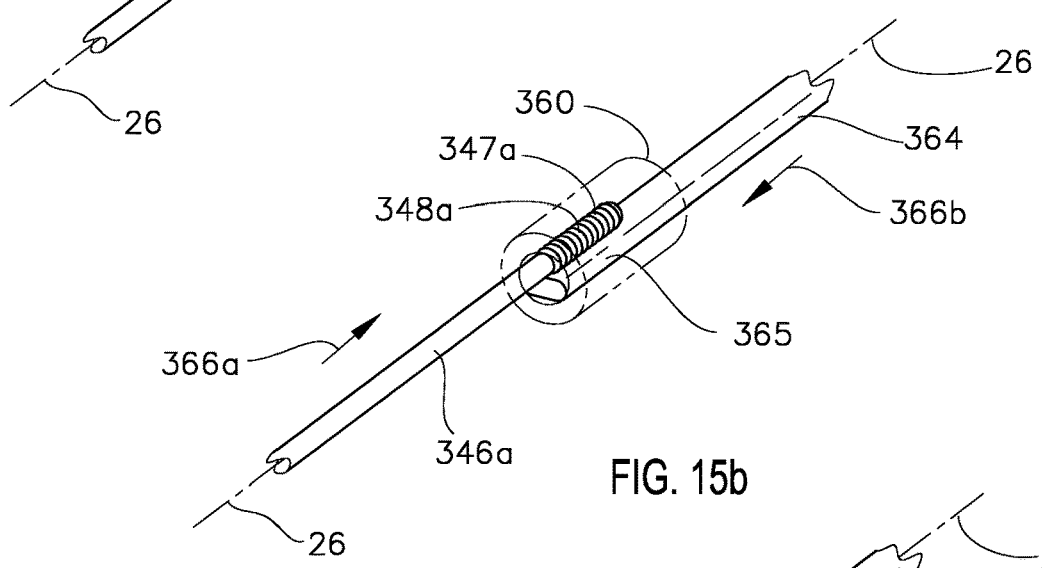
Figure 15C:
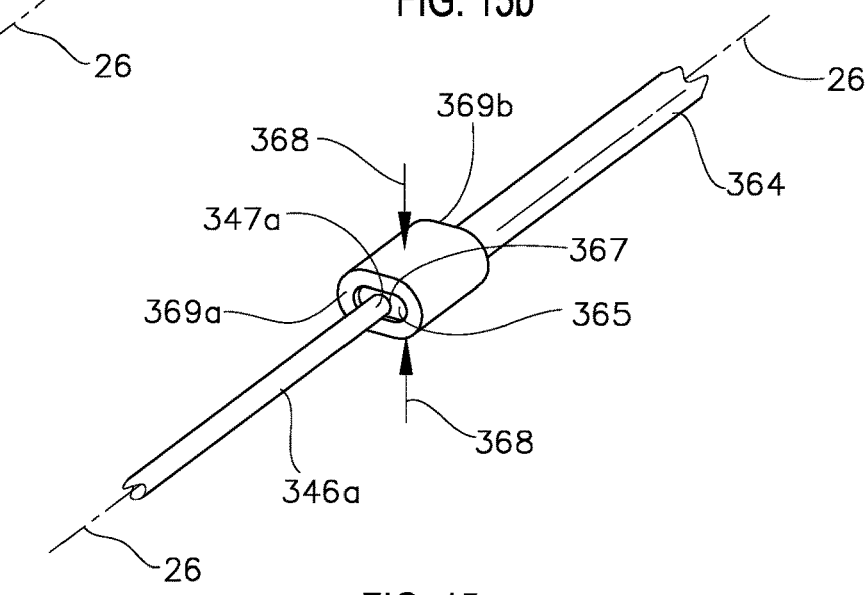

FIGS. 15a-c describe an embodiment similar to the embodiment of FIGS. 21a-c, with the connector 360 providing a coupling function between two spokes 346a and 364, where these spokes are also directly engaged to each other. Spoke 346a is of harder material, such as stainless steel, and includes end portion 347a with ribs 348a. Spoke 364b has a flattened cross section and is of softer material, such as fiber-reinforced polymer, and includes end portion 365. Connector 360 is of an intermediate hardness material, such as aluminum, and includes outer surface 361, end faces 369a and 369b, and internal hole 362 that extends through the connector along the longitudinal axis 26. As shown in FIG. 15*a*, end portions 347*a* and 365 are aligned to be inserted into the connector 360. Next, as shown in FIG. 15*b*, the spokes 346*a* and 364*b* are inserted in respective directions 366*a* and 366*b* into hole 362 such that connector 360 (shown in phantom for clarity) covers and surrounds end portions 347*a* and 365. End portions 347*a* and 365 are overlapped along the longitudinal axis 26. Finally, as shown in FIG. 15*c*, the connector 360 is plastically crimped in direction 368 and reduced as previously described herein. The hole 362 is similarly shrunk inwardly such that ribs 348*a* are pressed and embedded into softer end portion 365 in direction 368 and end portion 365 is debossed and deformed to conform to the contour of ribs 348*a* at connecting interface 367 therebetween. Thus, ribs 348*a* have an interlocking engagement with end portion 365 for a direct connection therebetween. The deformed connector 360 serves to maintain this interlocked engagement and press ribs 348*a* and end portion 365 into intimate engagement. This connection between spokes 346*a* and 364*b* can now support spoke tension 30 forces, while end faces 369*a* and 369*b* serve as laterally outwardly projecting engagement surfaces that may be utilized to create an overlie engagement for connection with a bracing element (not shown) as described variously herein. Spokes 364*a* and 364*b*, as joined in FIG. 15*c*, may serve as two spans of a duplex spoke configuration, with a common portion to which connector 360 is secured. The features of such a duplex spoke are further described in FIGS. 7*c-d*.

Figure 16A:
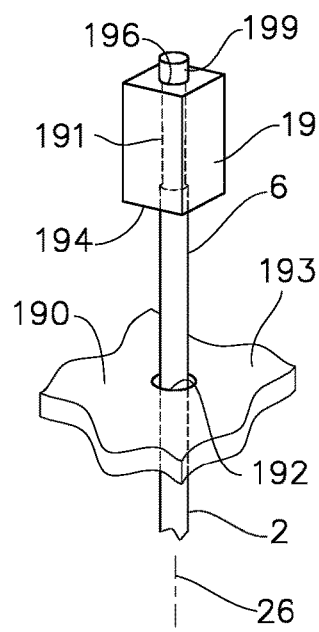
FIG. 16a is partial perspective view of an additional embodiment of the present invention, in partially exploded assembly, including a bracing element.
Figure 16B:
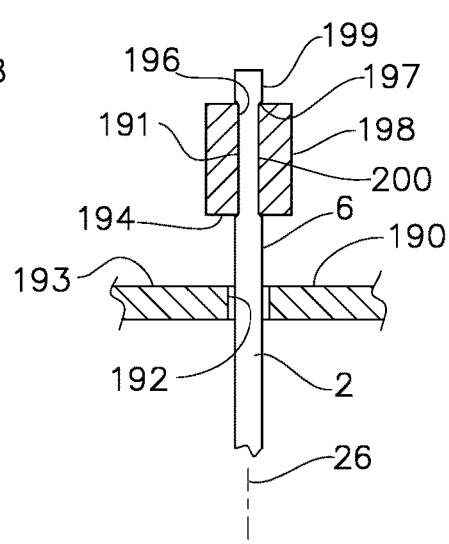
FIG. 16b is a partial cross-sectional view of the embodiment of FIG. 24a, taken parallel to the tensile axis, in partially exploded assembly, illustrating the connector in frictionally gripped engagement with the spoke.
Figure 16C:
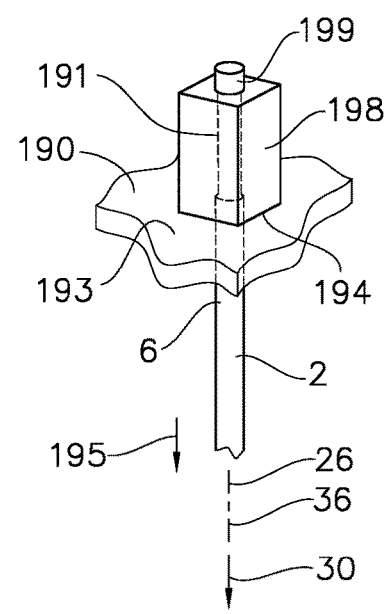
FIG. 16c is partial perspective view of the embodiment of FIG. 24a, showing an overlie engagement between the connector and bracing element.

FIGS. 16*a-c* describe one illustrative example of how a spoke, including a crimped connector, may be anchored against a bracing element. Spoke 2 is joined to connector 198 via a crimped joinder as described variously herein. As shown in FIG. 16*a*, the connector 198 includes cavity or hole 196 extending therethrough and downward facing bearing surface 194 for engagement with the bracing element 190. Bearing surface 194 is a laterally outwardly projecting surface that is also the longitudinally inward-facing end face and end terminus of the connector 198. It may be viewed that connector 198 serves as an enlarged portion of the spoke 2 and that bearing surface 194 serves as an engagement or transition surface. The second end 6 of the spoke 2 extends through the connector 198 to include an exposed portion 199 and an impinged and debossed region 191 at its interface with the connector 198. Bracing element 190 includes bracing face 193 and hole 192, through which the spoke 2 is extended to pass. The bracing element 190 is representative of the spoke bed of a rim or of a hub flange to which the spoke 2 is connected.

As shown in FIG. 16*b*, and in contrast to embodiments which employ a configured surface in the spoke and/or the mating hole, both the outer surface of the spoke 2 and the hole 196 have generally smooth sidewalls. When the connector 198 is crimped to create a crimped joinder with the spoke 2, the smooth hole 196 squeezes, impinges, and debosses the smooth outer surface of the spoke 2 and causes the second end 6 to neck slightly in its impinged region 191, with its cross section shrinking slightly. However, the degree of mechanical interlock between the connector 198 and the spoke 2 may be minimal, as compared with several of the previous embodiments that utilize a configured internal surface of the connector, and the crimped joinder relies primarily on a gripped frictional connection at connecting interface 200. It is noted that the exposed portion 199 external to the impinged region 191 maintains its original cross section, so that there exists a slight transition surface 197 between the impinged region 191 and the exposed portion 199. This transition surface 197 provides an overlie engagement between the spoke 2 and connector 198.

With the application of spoke tension 30 along tensile axis 36, the spoke is drawn in direction 195 so that bearing surface 194 bears against bracing face 193 in an overlie engagement as shown in FIG. 16*c*. Thus the spoke 2 is firmly anchored against the bracing element 190 via the connector 198. This embodiment is illustrative of how the connector 198 may directly engage the bracing element 190 to support and brace against spoke tension 30. Of course, any manner of intermediate elements may alternatively be utilized between the spoke 2 and the bracing element 190 to optimize the interface between these two components. For example, it may be desirable to incorporate a flat washer (not shown) between the bearing surface 194 and the bracing face 193 to distribute this contact interface stress due to spoke tension 30 loads over a broader surface area of the bracing element 190. This embodiment also shows a general arrangement where the connector 198 includes a bearing surface 194 that creates a projected area of overlie that is generally perpendicular to the tensile axis 36 to create an overlie engagement to effectively terminate the spoke 2.

It should be noted that, the bearing surface 194 provides engagement geometry to engage the connector 198 directly to the bracing element 190. Bearing surface 194 has similar function to transition surface 32 of FIGS. 3*a-b*, however bearing surface 194 extends directly to the surface of the spoke 2, whereas transition surface 32 extends only to the shank portion 29. Such an arrangement with bearing surface 194 may be preferable, since there is no shank (i.e. shank portion 29 of FIGS. 3*a-b*) required, which allows the surface area of bearing surface 194 to be maximized and extend to the outer surface 191 of spoke 2.

Figure 17A:
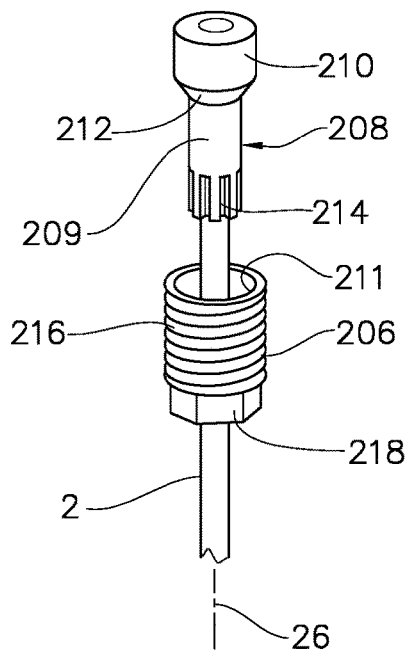
FIG. 17a is a partial perspective exploded view of an additional embodiment of the present invention, showing a connector connected to a spoke and including an intermediate connecting element such as a ferrule.
Figure 17B:
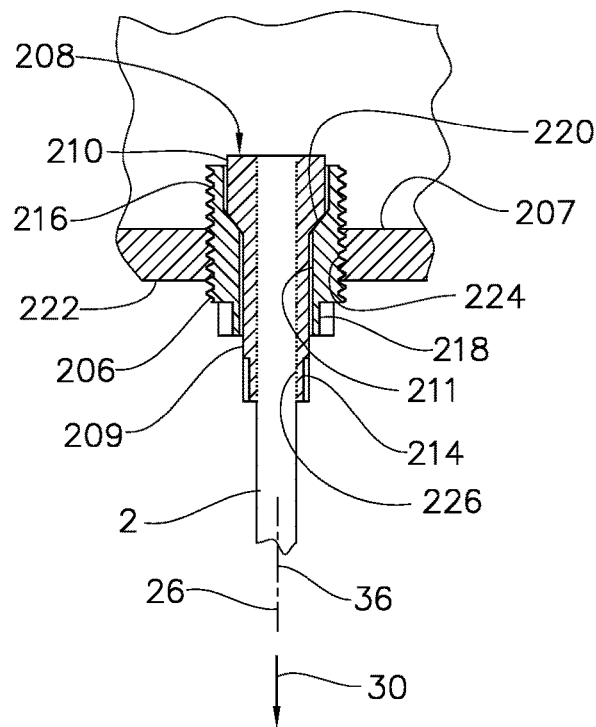
FIG. 17b is a partial cross-sectional view of the embodiment of FIG. 17a, showing the assembly of the spoke, connector, intermediate connecting element and rim where the intermediate connecting element is connected to the rim.

FIGS. 17*a-b* describe an example illustrating how an intermediate connecting element, such as threaded ferrule 206, may be incorporated in the present invention. Connector 208 includes shank portion 209, enlarged portion 210 and a transition surface or flared shoulder 212 therebetween. One end of the connector 208 includes splines 214 to create a non-circular surface that may mate with a wrench (not shown) for rotational manipulation of the connector 208. Threaded ferrule 206 includes opening 211 therethrough and external threads 216 and flats 218 to mate with a wrench (not shown) for rotational manipulation of the threaded ferrule 206. The opening 211 includes a bearing surface or step 220 to create a closely matched bearing surface to mate with the flared shoulder 212 of the connector 208. Connector 208 is joined to the spoke 2 by means of a crimped joinder at an engagement interface 226. Engagement interface 226 is shown in FIGS. 17*a-b* to be generally schematic and to be merely representative of a wide range of engagement interfaces described variously herein. A bracing element, such as a rim 222 or hub flange (not shown), includes a threaded hole 224 to accept external threads 216, as shown in FIG. 17*b*.

As shown in FIG. 17*b*, threaded ferrule 206 is threadably assembled and engaged to the threaded hole 224. Spoke tension 30 is then applied to the spoke 2, which draws the flared shoulder 212 to bear against step 220 in an overlie engagement. The spoke 2 is now engaged to the spoke bed 207 by means of the connector 208 and the threaded ferrule 206. By utilizing separate wrenches on splines 214 and flats 218, the threaded ferrule 206 may be rotated independently from the connector 208 about the longitudinal axis 26. Threaded ferrule 206 may be rotated relative to rim 222 to adjust the effective length of the spoke 2, thus adjusting the spoke tension 30. Thus, it may be seen that the threaded ferrule 206 serves as an intermediate connecting element to facilitate the connection between the spoke 2 and the bracing element or rim 222. It is noted that the embodiment of FIGS. 25a-b employs a threaded engagement between the intermediate connecting element (threaded ferrule 206) and the bracing element (rim 222).

While my above description contains many specificities, these should not be construed as limitations on the scope of the invention, but rather as exemplifications of embodiments thereof.

While the connecting element of the present invention may be directly connected to the bracing element (such as the rim or the hub), there are many cases where it is desirable to include one or more intermediate connecting elements to facilitate this connection. For example, the connector may engage the intermediate connecting element and the intermediate connecting element may engage the bracing element.

While the embodiments described herein do not mention the use of adhesive or bonding agent to join the connecting element to the spoke, it is envisioned that the use of adhesive within the engagement interface may be utilized to augment the strength of the crimped joinder. In an exemplary arrangement, an epoxy paste adhesive may be applied to the internal hole of the connector and/or the external surface of the spoke prior positioning the spoke within the hole. The spoke is then inserted in the hole and the connector is crimped as previously described, thus trapping and compressing the adhesive within the connecting interface. After the adhesive is cured, the adhesive serves to further augment the joinder between the spoke and the connector.

The embodiments shown here show the spokes being held in tension, in the construction of tension-spoke wheels. This is for common illustration purposes only. It is understood that the spokes of these embodiments may alternatively be configured to be held in compression, in construction of compression-spoke wheels.

While several of the embodiments shown describe a single connector to anchor a single spoke, it is also envisioned that a multiplicity of connectors may be utilized to anchor a single spoke. For example, a multiplicity of connecting elements may be crimped to a single spoke, each having its own corresponding engagement interface. Alternatively, a single spoke may be joined to a single connecting element at a multiplicity of discreet engagement interfaces.

While the above description is particularly focused on bicycle or vehicle wheel spokes as tensile elements, and this is the preferred embodiment of the present invention, however it is envisioned that the present invention may be adapted to applications involving a wide range of tensile element applications outside of vehicle wheel applications. Some example applications may include control cables, guy wires, fiber optic cables, overhead high-tension lines, architectural and infrastructure cabling, pre-stressed rebar, etc.

Thus, the present invention provides a system for the connection of a tensile element that is inexpensive to produce, lends itself easily to high-volume manufacturing methods, is light in weight and is strong and reliable. Further, the present invention allows the connector to include geometry to optimize its engagement with the bracing element and/or an intermediate element. Further still, the present invention reduces weight by facilitating the utilization of light weight materials, by allowing greater freedom in geometry to optimize the design, by facilitating the use of fiber reinforced spokes. Yet further, the present invention increases the strength and reliability of the connection by reducing stresses in components and connections and by eliminating any clearances or relative movement between the hub and spokes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A connecting system for a longitudinal tensile element, comprising:
   a tensile element;
   a connecting element;
   wherein said tensile element is a longitudinal element having a longitudinal length greater than its lateral width, including a longitudinal axis along said longitudinal length, an external surface, and an applied tensile load along said longitudinal axis;
   wherein said connecting element includes an external connector surface and an internal cavity with an internal connector surface;
   wherein said internal connector surface includes a preformed lateral connector surface that extends generally laterally inwardly relative to said longitudinal axis;
   wherein said internal cavity sleevably overlaps at least a portion of said tensile element along said longitudinal axis in an overlap region;
   wherein said connecting element is crimped to create a crimped joinder between said connecting element and said tensile element, whereby at least a portion of said external connector surface is pressed to plastically deform said connecting element and to displace at least a portion of said internal connector surface in a direction laterally proximal to said external surface in said overlap region such that said crimped joinder causes said internal connector surface to deboss said external surface in said overlap region;
   wherein said connecting element includes a laterally projecting overlie surface to provide an overlie engagement with a bracing element connected thereto;
   wherein both said crimped joinder and said external overlie engagement support said tensile load.

2. The connecting system according to claim 1, wherein said plastic deformation is in a crimp portion of said external connector surface and said overlie surface is one of: longitudinally inwardly offset from said crimp portion; and longitudinally outwardly offset from said crimp portion.

3. The connecting system according to claim 1, wherein said plastic deformation is in a crimp portion of said external connector surface and said overlie surface projects laterally outwardly relative to said crimp portion.

4. The connecting system according to claim 1, wherein said overlie surface is a thread flank of a helical thread rib.

5. The connecting system according to claim 1, wherein said overlie surface is in a laterally outwardly projecting flange.

6. The connecting system according to claim 1, wherein said overlie surface circumscribes said tensile element about said longitudinal axis.

7. The connecting system according to claim 1, including a plurality of said overlie surfaces, including a first overlie surface and a second overlie surface.

8. The connecting system according to claim 1, including a plurality of said overlie surfaces, including a first overlie surface and a second overlie surface, wherein said first overlie surface is laterally opposed to said second overlie surface.

9. The connecting system according to claim 1, wherein said overlie surface is integral and monolithic with said connecting element.

10. The connecting system according to claim 1, wherein said overlie surface is in an element discreet from said connecting element.

11. The connecting system according to claim 1, according to claim 1, wherein said overlie surface is in an element discreet from said connecting element and wherein said crimped joinder serves to connect said overlie surface to said tensile element.

12. The connecting system according to claim 1, wherein said plastic deformation of said external connector surface serves to create said overlie surface.

13. The connecting system according to claim 1, wherein said connecting element includes a shank portion and an enlarged portion, wherein said plastic deformation of said external connector surface is in said shank portion and said overlie surface is in said enlarged portion.

14. The connecting system according to claim 1, wherein said overlie surface is in the end terminus of said connecting element.

15. The connecting system according to claim 1, wherein said tensile element is a duplex tensile element, including a first span portion and second span portion thereof and a common portion therebetween, wherein said connecting element is connected to said common portion.

16. The connecting system according to claim 1, wherein said connecting element includes non-circular geometry to facilitate the manipulation of said connecting element about said longitudinal axis.

17. The connecting system according to claim 1, wherein said plastic deformation creates a deformed region of said external connector surface, wherein said deformed region includes non-circular geometry to facilitate the manipulation of said connecting element about said longitudinal axis.

18. The connecting system according to claim 1, wherein a multiplicity of said tensile elements are joined to a single one of said connecting element by means of said crimped joinder.

19. The connecting system according to claim 1, wherein said internal cavity is a blind cavity of limited depth.

20. The connecting system according to claim 1, wherein said internal cavity is a through cavity that extends through said connecting element.

21. The connecting system according to claim 1, wherein said connecting element is adapted to be engaged to a bracing element by means of a direct overlie engagement between said overlie surface and said bracing element.

* * * * *